(12) United States Patent
Elmasri et al.

(10) Patent No.: US 11,721,138 B1
(45) Date of Patent: Aug. 8, 2023

(54) METHODS FOR ACTION TRIGGER MANAGEMENT IN A TELEMATICS DEVICE

(71) Applicant: Geotab Inc., Oakville (CA)

(72) Inventors: Shamseddin Ali T Elmasri, Kitchener (CA); Abdelraheem Alkuor, Kitchener (CA); Daniel Raymond Lizewski, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/112,162

(22) Filed: Feb. 21, 2023

Related U.S. Application Data

(60) Provisional application No. 63/442,477, filed on Feb. 1, 2023.

(51) Int. Cl.
*G07C 5/00* (2006.01)
*G06F 11/30* (2006.01)

(52) U.S. Cl.
CPC .......... *G07C 5/008* (2013.01); *G06F 11/3072* (2013.01)

(58) Field of Classification Search
CPC combination set(s) only.
See application file for complete search history.

(56) References Cited

U.S. PATENT DOCUMENTS

2023/0058660 A1\* 2/2023 Kanthimathinathan ..................... G08G 1/127

\* cited by examiner

*Primary Examiner* — Michael V Kerrigan
(74) *Attorney, Agent, or Firm* — Sherif A. Abdel-Kader

(57) ABSTRACT

A method for trigger action management in a telematics device, and a telematics device employing the method are provided. The method includes receiving a log and trigger configuration, and in response to detecting a trigger condition, performing an associated action.

20 Claims, 20 Drawing Sheets

Log and Trigger
Configuration Structure

METHODS FOR ACTION TRIGGER MANAGEMENT IN A TELEMATICS DEVICE

FIELD

The present disclosure generally relates to vehicle telematics, and more specifically to methods for action trigger management in a telematics device.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method in a telematics device coupled to an asset communications bus of a vehicle. The method comprises receiving a log and trigger configuration, in response to determining that the log and trigger configuration contains a new log identifier creating a log configuration based on the log and trigger configuration, in response to determining that the log and trigger configuration contains an existing log identifier identifying the log configuration associated with the existing log identifier, associating the trigger configuration with the log configuration, and in response to detecting the trigger condition, performing the associated action.

The method further comprises deleting the trigger configuration in response to receiving a trigger removal request.

Creating the log configuration may comprise creating an entry for storing the log configuration in a database.

Creating the log configuration comprises creating an AVL tree node in an AVL tree for storing the log configuration.

Associating the trigger configuration with the log configuration may comprise adding the trigger configuration to a list connected to the AVL tree node.

Detecting the trigger condition may comprise capturing asset data from the vehicle via the asset communications bus and evaluating the trigger condition for the asset data.

Detecting the trigger condition may comprise evaluating the trigger condition for debug data generated by the telematics device.

The log and trigger configuration may comprise a callback function, and performing the associated action may comprise calling the callback function.

The log and trigger configuration may comprise a message type and performing the associated action may comprise sending a message of the message type to an application.

The log and trigger configuration may include a data trigger type, and the AVL tree may be selected from a plurality of AVL trees based on the data trigger type.

In another aspect of the present disclosure, there is provided a telematics device for coupling to an asset communications bus of a vehicle. The telematics device comprises a controller, a network interface coupled to the controller, and a memory coupled to the controller and storing machine-executable programming instructions. The machine-executable programming instructions when executed by the controller, configure the telematics device to receive a log and trigger configuration, in response to determining that the log and trigger configuration contains an existing log identifier identify the log configuration associated with the existing log identifier, create a trigger configuration including a trigger condition and an associated action, associate the trigger configuration with the log configuration, and in response to detecting the trigger condition, perform the associated action.

The machine-executable programming instructions may further configure the telematics device to delete the trigger configuration in response to receiving a trigger removal request.

The machine-executable programming instructions which configure the telematics device to create the log configuration may comprise machine-executable programming instructions which configure the telematics device to store the log configuration in a database.

The machine-executable programming instructions which configure the telematics device to create the log configuration may comprise machine-executable programming instructions which configure the telematics device to create an AVL tree node in an AVL tree for storing the log configuration.

The machine-executable programming instructions which configure the telematics device to associate the trigger configuration with the log configuration may comprise machine-executable programming instructions which configure the telematics device to add the trigger configuration to a list connected to the AVL tree node.

The machine-executable programming instructions which configure the telematics device to detect the trigger condition may comprise machine-executable programming instructions which configure the telematics device to capture asset data from the vehicle via the asset communications bus and evaluate the trigger condition for the asset data.

The machine-executable programming instructions which configure the telematics device to detect the trigger condition may comprise machine-executable programming instructions which configure the telematics device to evaluate the trigger condition for debug data generated by the telematics device.

The log and trigger configuration may comprises a callback function and the machine-executable programming instructions which configure the telematics device to perform the associated action may comprise machine-executable programming instructions which configure the telematics device to call the callback function.

The log and trigger configuration may comprise a message type and the machine-executable programming instructions which configure the telematics device to perform the associated action may comprise machine-executable programming instructions which configure the telematics device to send a message of the message type to an application.

The log and trigger configuration includes a data trigger type, and the AVL tree is selected from a plurality of AVL trees based on the data trigger type.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
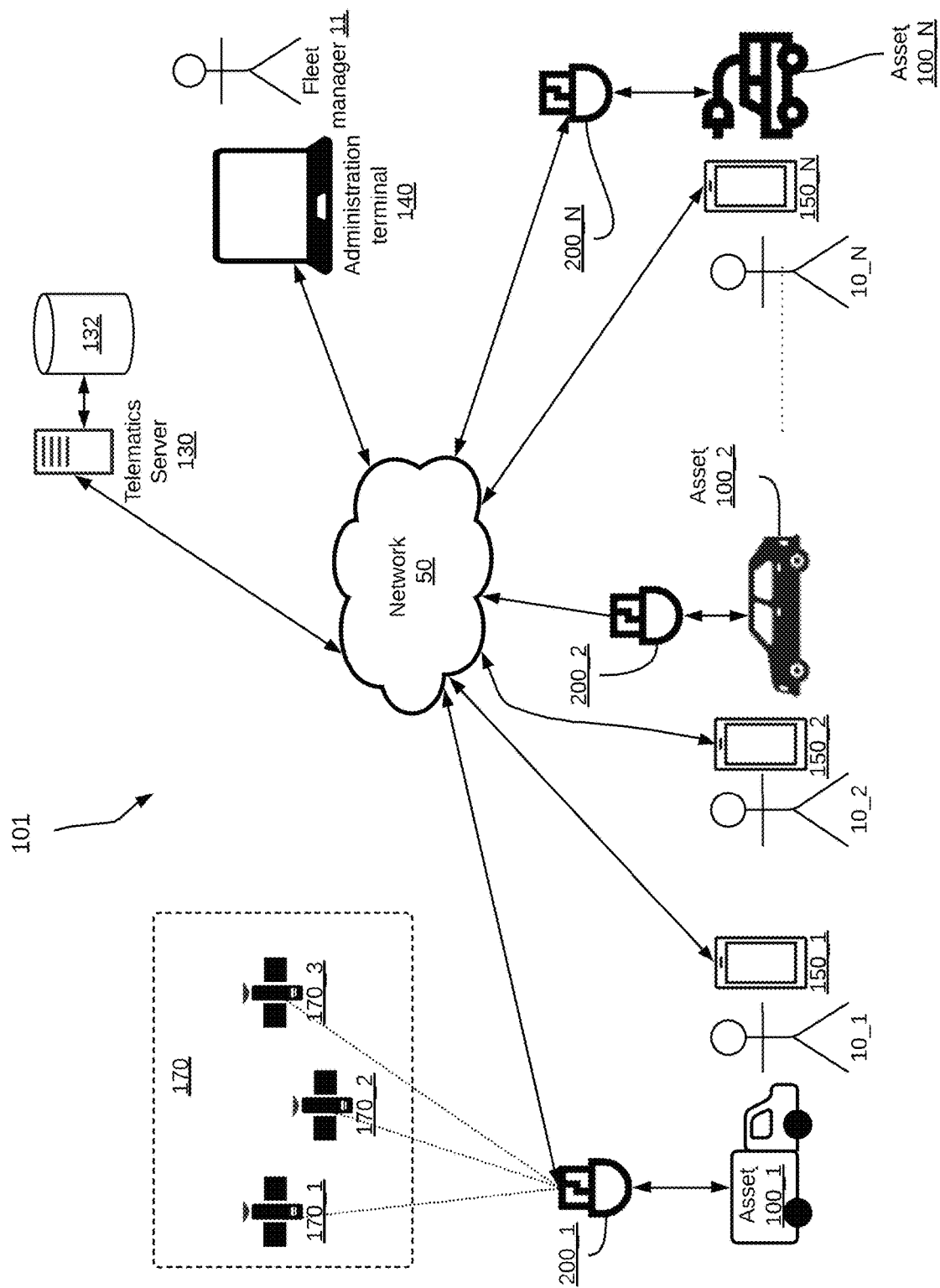
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

The telematics server 130 is an electronic device executing machine-executable programming instructions which enable the telematics server 130 to store and analyze telematics data. The telematics server 130 may be a single computer system or a cluster of computers. The telematics server 130 may be running an operating system such as Linux, Windows, Unix, or any other equivalent operating system. Alternatively, the telematics server 130 may be a software component hosted on a cloud service, such as Amazon Web Service (AWS). The telematics server 130 is connected to the network 50 and may receive telematics data from the telematics devices 200. The telematics server 130 may have a plurality of software modules for performing data analysis and analytics on the telematics data to obtain useful asset information about the assets 100. The telematics server 130 may be coupled to a telematics database 132 for storing telematics data and/or the results of the analytics which are related to the assets 100. The asset information stored may include operator information about the operators 10 corresponding to the assets. The telematics server 130 may communicate the asset data and/or the operator information pertaining to an asset 100 to one or more of: the administration terminal 140, and the operator terminal 150.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 140 is an electronic device, which may be used to connect to the telematics server 130 to retrieve data and analytics related to one or more assets 100 or to issue commands to one or more telematics device 200 via the telematics server 130. The administration terminal 140 is shown as a laptop computer, but may also be a desktop computer, a tablet (not shown), or a smartphone. The administration terminal 140 may run a web browser or a custom application which allows retrieving data and analytics, pertaining to one or more assets 100, from the telematics server 130 via a web interface of the telematics server 130. The administration terminal 140 may also be used to issue commands to one or more telematics device 200 via the telematics server 130. A fleet manager 11 may communicate with the telematics server 130 using the administration terminal 140. In addition to retrieving data and analytics, the administration terminal 140 allows the fleet manager 11 to set alerts and geofences for keeping track of the assets 100, receiving notifications of deliveries, and so on.

The operator terminals 150 are electronic devices, such as smartphones or tablets. The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by an operator 10 to inform the telematics server 130 that the asset 100 is currently being operated by the operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data." The telematics device 200 sends the telematics data to the telematics server 130 over the network 50. The telematics server 130 may process, aggregate, and analyze the telematics data to generate asset information pertaining to the assets 100 or to a fleet of assets. The telematics server 130 may store the telematics data and/or the generated asset information in the telematics database 132. The administration terminal 140 may connect to the telematics server 130, over the network 50, to access the generated asset information. Alternatively, the telematics server 130 may push the generated asset information to the administration terminal 140. Additionally, the operators 10, using their operator terminals 150, may indicate to the telematics server 130 which assets 100 they are associated with. The telematics server 130 updates the telematics database 132 accordingly to associate the operator 10 with the asset 100. Furthermore, the telematics server 130 may provide additional analytics related to the operators 10 including work time, location, and operating parameters. For example, for vehicle assets, the telematics data may include turning, speeding, and braking information. The telematics server 130 can correlate the telematics data to the vehicle's driver by querying the telematics database 132. A fleet manager 11 may use the administration terminal 140 to set alerts for certain activities pertaining to the assets 100. When criteria for an alert is met, the telematics server 130 sends a message to the administration terminal 140 to notify a fleet manager 11, and may optionally send alerts to the operator terminal 150 to notify an operator 10 of the alert. For example, a vehicle driver operating the vehicle outside of a service area or hours of service may receive an alert on their operator terminal 150. A fleet manager 11 may also use the administration terminal 140 to configure a telematics device 200 by issuing commands thereto via the telematics server 130. Alerts may also be sent to the telematics device 200 to generate an alert to the driver such as a beep, a displayed message, or an audio message.

Telematics Device

Figure 2:
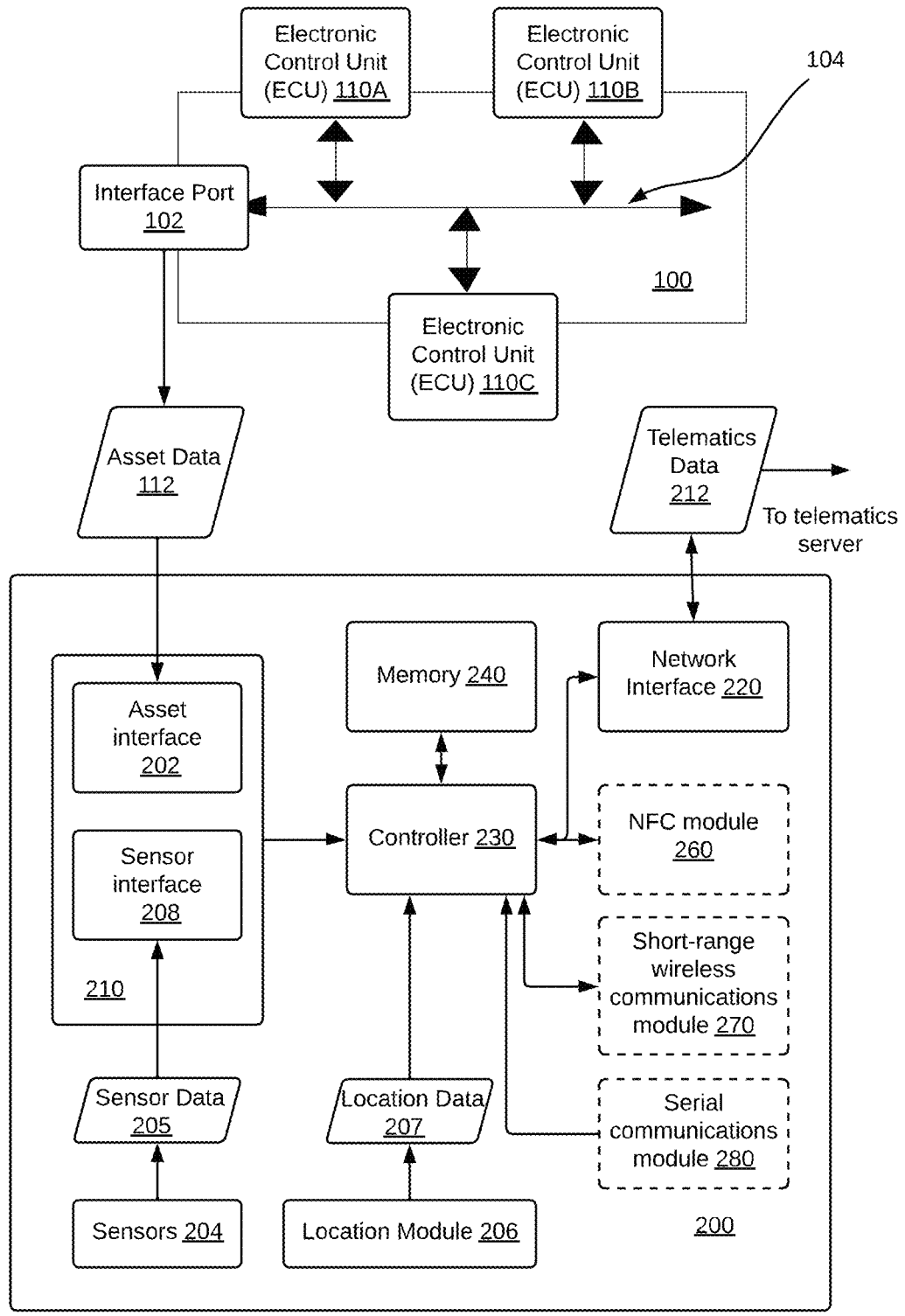
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an engine coolant temperature (ECT) ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus. One example of an asset communications bus is a Controller Area Network (CAN) bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 104. Most passenger vehicles use the SAE J1979 protocol, which is commonly known as On-Board Diagnostic (OBD) protocol to exchange information between ECUs 110 on their CAN bus 104. In industrial automation, ECUs use a CANOpen protocol to exchange information over a CAN bus 104. An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to conduct the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may be storing machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 130 over a network 50. In some embodiments, the memory 240 only stores data, and the machine-executable programming instructions for conducting the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is traveling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 130. The network interface 220 may be used to transmit telematics data 212 obtained from the asset 100 to the telematics server 130 for a telematics service or other purposes. The network interface 220 may also be used to receive instructions from the telematics server 130 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 130.

The short-range wireless communications module 270 is a component intended for providing short-range wireless communication capability to the telematics device 200. The short-range wireless communications module 270 may be a Bluetooth™. wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I2C) bus. As another example, the serial communications module 280 may be a universal serial bus (USB) transceiver.

In operation, an ECU 110, such as the ECU 110A, the ECU 110B, or the ECU 110C communicates asset data over the CAN bus 104. The asset data exchanged between the ECUs 110, over the CAN bus 104 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 which is composed of asset data 112 gathered from the asset 100 combined with the sensor data 205 and the location data 207 may be used to derive useful data and analytics, by the telematics server 130. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
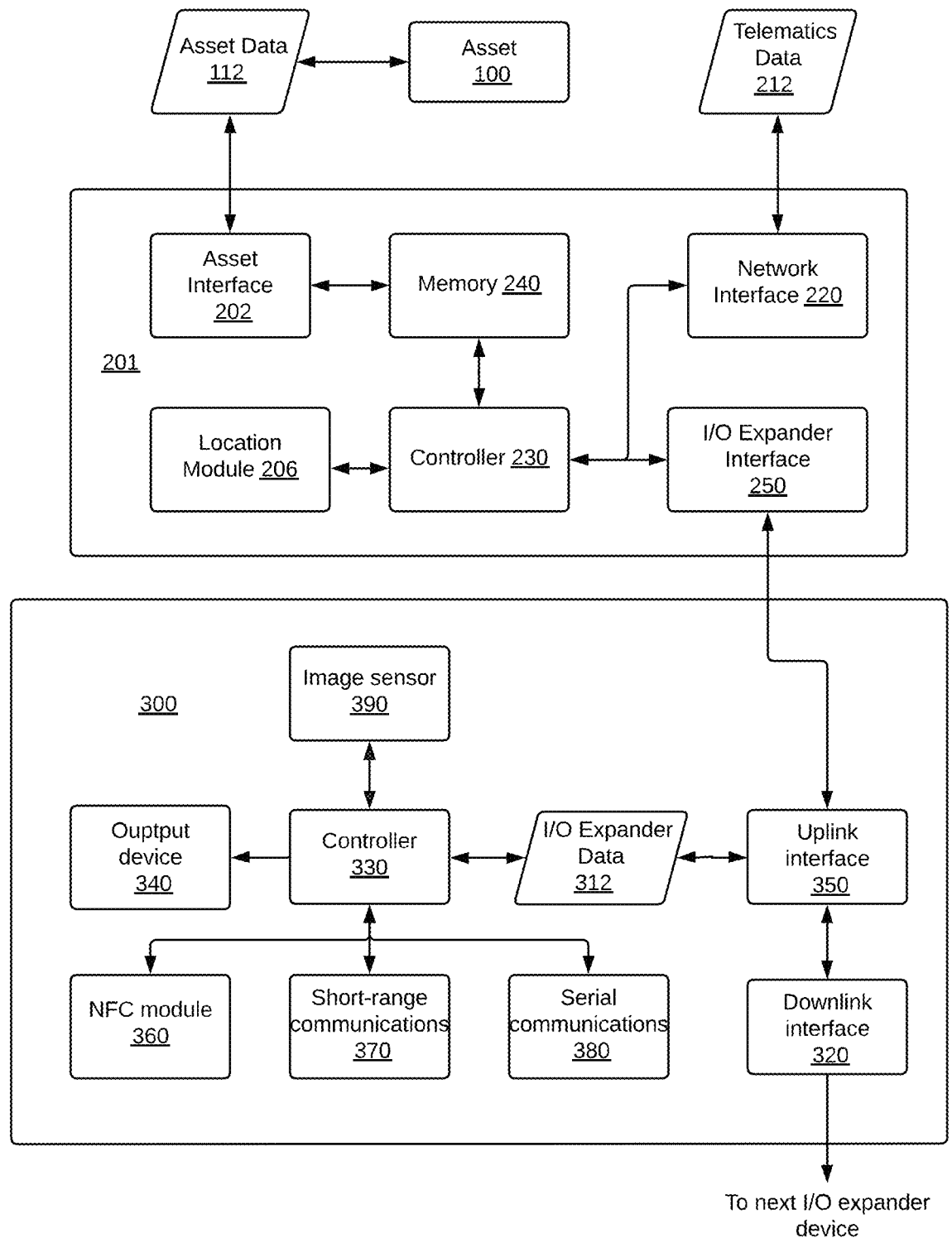
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 201 coupled to an asset 100. An I/O expander 300 is coupled to the telematics device 201.

The asset 100 is similar to the asset 100 of FIG. 2 and therefore the internal components thereof are not shown in FIG. 3 for simplicity.

The telematics device 201 has a somewhat similar configuration as the telematics device 200 of FIG. 2, but some of the optional components have been removed. Furthermore, the telematics device 201 adds an I/O expander interface 250 for interfacing with the I/O expander 300. The I/O expander interface 250 is coupled to the controller 230 and may be configured for exchanging I/O expander data 312 with the I/O expander 300.

The I/O expander 300 of FIG. 3 is an example I/O expander which is designed to provide additional connectivity options to a telematics device 200, which has more limited features than the one shown in FIG. 2. For example, the telematics device 201 shown in FIG. 3 does not have an NFC module, a short-range wireless communications module, or a serial communications module. Instead, the telematics device 201 has an I/O expander interface 250.

The I/O expander 300 may be an input device configured to capture additional data such as video frames, audio frames, or proprietary signals and provide that data to the telematics device 201. Alternatively, or additionally, the I/O expander 300 may be configured as an output device and may include a display for displaying information and/or an audio output device for broadcasting messages pertaining to the asset 100.

An I/O expander 300, which connects with the telematics device 201, varies in complexity depending on the purpose thereof. FIG. 3 shows an I/O expander 300 containing several components which may or may not all be present in other I/O expanders. For example, the I/O expander 300 includes a controller 330, an NFC module 260, an output device 340, a short-range communications module 370, an image sensor 390, a serial communications module 380, an uplink interface 350 and a downlink interface 320.

The controller 330 may be similar to the controller 230 in FIG. 3. In some embodiments, the controller 330 is a microcontroller with versatile I/O capabilities. For example, the controller 330 may be a microcontroller which has a plurality of I/O ports such as general-purpose inputs and outputs (GPIOs), serial ports, analog inputs, and the like. In some embodiments, the controller 330 may have built-in persistent memory such as flash memory on which machine-executable programming instructions for conducting the functionality of the I/O expander 300 may be stored. In other embodiments, the controller 330 may be coupled to a persistent memory module (not shown) that contains the machine-executable programming instructions for conducting the functionality of the I/O expander 300. The controller 330 may also have built-in volatile memory, such as random-access memory (RAM) for storing data. Alternatively, the I/O expander 300 may be connected to an external volatile memory for storing data.

The output device 340 receives data from the controller 330 and performs an output function. For example, the output device 340 may include a display for displaying information received from the controller 330. As another example, the output device 340 may include a speech synthesizer and a speaker for displaying audible information received from the controller 330. As yet another example, the output device 340 may be an output interface to a hardware device. For example, the output device 340 may be a motor controller that interfaces to an electric motor.

The NFC module 360, short-range communications module 370, and the serial communications module 380 are similar to the NFC module 260, short-range wireless communications module 270, and the serial communications module 280 described above with reference to FIG. 2.

The image sensor 390 may be a digital still camera or a digital video camera capable of capturing images. For example, the image sensor 390 may be a road-facing dashboard camera for monitoring the road ahead. In other examples, the image sensor 390 may be a driver-facing dashboard camera for identifying the operator 10 and/or their condition.

The uplink interface 350 is an electronic peripheral interface coupled to the controller 330 and is used to provide data exchange and/or power capabilities to the I/O expander 300. The uplink interface 350 allows the I/O expander 300 to transmit and receive I/O expander data. The uplink interface 350 is configured to use the same protocol and signaling as the I/O expander interface 250 of the telematics device 201. Accordingly, the I/O expander 300 may exchange the I/O expander data with the telematics device 201. In some embodiments, the uplink interface 350 may also include power pins connected to corresponding power pins in the I/O expander interface 250, thus allowing the I/O expander 300 to be powered via the telematics device 201. In other embodiments (not shown), the I/O expander 300 may have its own power source instead of or in addition to the power provided by the telematics device 201 via the uplink interface 350.

The downlink interface 320 is an electronic peripheral interface coupled to the uplink interface 350. The downlink interface 320 is configured to interface with the uplink interface 350 of another I/O expander 300 (as will be described below). Allowing the uplink interface 350 to connect to the downlink interface 320 of another I/O expander allows the daisy chaining of I/O expanders.

Integrated Telematics Device

Figure 4:
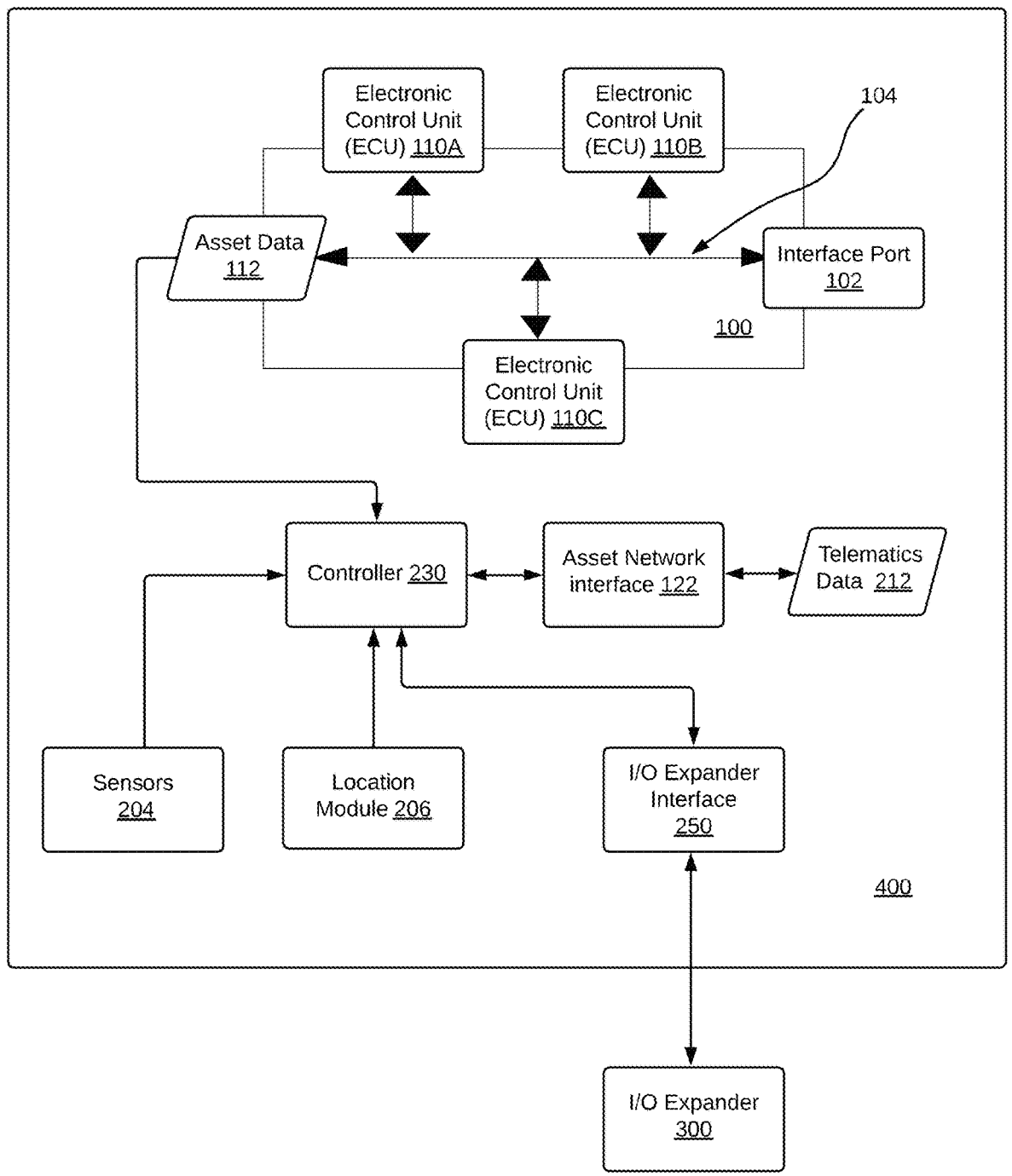
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 400 with the components of a telematics device integrated therein, in accordance with embodiments of the present disclosure. The asset 400 is similar to the asset 100 but, being a connected asset such as a connected car, it has an asset network interface 122. In the depicted embodiment, the controller 230 is directly connected to the asset communications bus, which is a CAN bus 104 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 400 and may be used by the asset 400 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 300 may be connected to the asset 400 therethrough. The asset 400 may have an interface port 102 for connecting other devices other than a telematics device 200, such as a diagnostic tool including, but not limited to, an OBD-II reader device.

Capturing Asset Data

A telematics device 200 may capture asset data 112 via the interface port 102 of an asset 100 via one of two main methods. The first method is for the telematics device 200 to listen for information placed by the ECUs 110 on the asset communications bus. For example, for the CAN bus 104, the ECUs 110 may place broadcast CAN frames on the CAN bus 104 that the telematics device 200 can capture over the interface port. The second method is for the telematics device 200 to explicitly request information from a particular ECU 110 using a request command. A telematics device 200 may limit the number of request commands issued to ECUs 110 in an asset 100 in order not to overload the asset communications bus and/or to minimize the risk of interfering with the operation of some ECUs 110. However, there are instances when it is desired to log certain information in greater detail when a particular condition takes place. For example, one or more vehicles in a fleet may exhibit certain problems in a particular RPM range, such as 1500-2000 rpm. In this case, it is desirable that the telematics device 200 capture additional information from the one or more vehicles while they are operating in such RPM range. A system of log recording may be introduced to capture relevant logging information based on a particular condition. Alternatively or additionally, a fleet manager 20 may wish to capture logging information from one or more vehicles at a particular time of day or based on external conditions such as weather conditions or location.

Log Recording

In this disclosure "logging" information or "log recording" refers to capturing data and saving such data for later processing. For example, a telematics device "logs" asset data by capturing the asset data from the vehicle communications bus, then saving the asset data temporarily either in memory or storage. Additionally or alternatively, the telematics device may log "debug info" (or simply "debug") comprised of "debug events" and/or "debug messages". Debug events are events inserted into the firmware running in the telematics device to signal certain events. For example, the firmware may contain debug events that represent certain conditions detected by the firmware, either in the asset data or related to the status of the telematics device itself. For example, the firmware may contain statements inserting debug events when the telematics device is low on memory, experiences high motion, or is low on battery. Debug messages are text strings displaying information. Debug messages may be inserted in certain parts of the firmware of the telematics device to provide certain information. Accordingly, the "logged data" may comprise "asset data", "debug info", or both. Debug info may also be referred to as "debug data" or simply "debug". The logged data may be in the form of a binary object, such as a file, referred to as a "log". A log, therefore, may contain asset data and/or debug data. In some embodiments, the logged data (in the form of a log) is sent by the telematics device to a remote device such as a telematics server. In other embodiments, the logged data is sent by the telematics device, over a short range communications link, to an operator terminal. In other embodiments, the logged data is downloaded from the telematics device via a wired connection or by connecting an external device thereto.

In this disclosure, some abbreviations are used for simplicity. The word "configuration" is sometimes abbreviated as "config". The word "structure" is sometimes dropped. For example a "log configuration structure" is referred to as a "log config". Similarly, a "trigger configuration structure" is referred to as a "trigger config".

Figure 5:
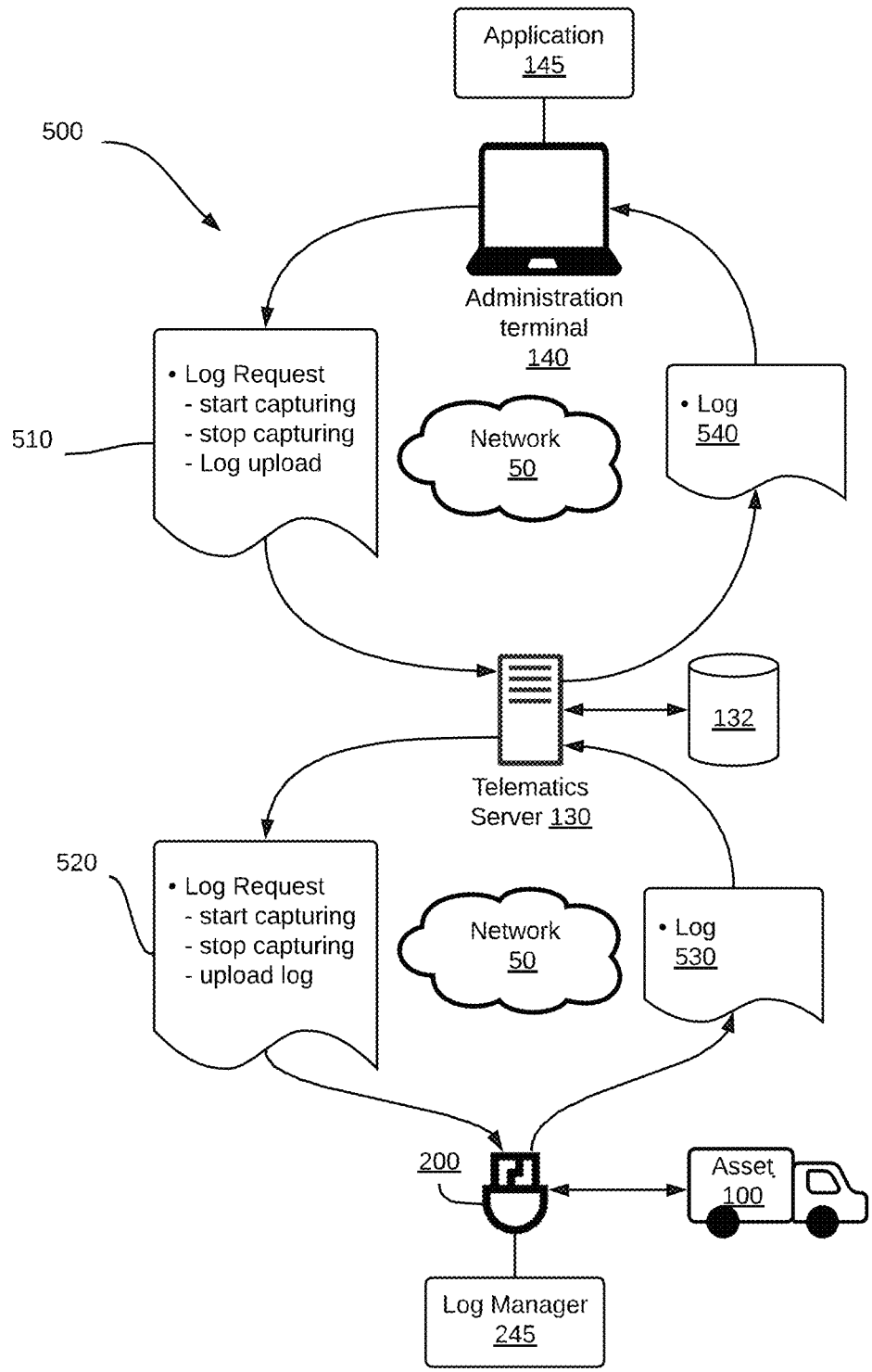
FIG. 5 is a diagram depicting a system for initiating, stopping, and uploading logs on a telematics device over a wide area communications network.

A log recording system 500 that allows a fleet manager using an administration terminal 140 to trigger log recording and uploading is shown in FIG. 5. In the depicted embodiment, the log recording system 500 is comprised of an administration terminal 140, a telematics server 130, and a telematics device 200 coupled to an asset 100. As described above, the administration terminal 140 communicates with the telematics server 130 over a network 50. Similarly, the telematics device 200 communicates with the telematics server 130 over the network 50. The administration terminal 140 may run a log request application, such as application 145. The application 145 may prepare log requests to start capturing data, stop capturing data, and upload captured logged data (logs) from a telematics device 200 to the telematics server 130 so it may be either pushed to or pulled from the administration terminal 140. The telematics device 200 may run a log manager 245 that responds to the log requests and sends the log data to the telematics server 130 for retrieval by the application 145 on the administration terminal.

In operation, a fleet manager 20 may run the application 145 on the administration terminal 140. The application 145 may, in response to commands by the fleet manager, prepare and send a log request 510 to the telematics server 130 over the network 50. The log request 510 may contain one of a number of commands. For example, in the depicted embodiment, the log request 510 may contain commands to start capturing, stop capturing, and upload log.

The start capturing command instructs a telematics device coupled to a particular vehicle to start capturing asset data and/or debug data. The command to start capturing asset data and/or debug data may be unconditional or conditional. In some embodiments, the command may start gathering certain types of asset data unconditionally. For example, the start capturing command may cause the telematics device to start gathering oil pressure data. In response, the telematics device 200 sends requests, over the vehicle communications bus, to the appropriate ECU 110 requesting that type of asset data. Similarly, the start capturing command may enable logging of debug data. For example, the start capturing command may enable logging debug events and/or debug messages. In some embodiments, debug events and/or debug messages may have levels assigned thereto. For example, debug messages may have low, medium, and high priorities. In such case, the start capturing command may instruct the firmware on the telematics device to start capturing messages of medium priority and high priority, for example. In some embodiments, the start capturing command includes a frequency of requesting the asset data. In this case, the start capturing command may cause the telematics device to periodically request the asset data, which may be of a particular type, with the specified frequency. For example, the start capturing command may cause the telematics device to request coolant temperature every 5 minutes. In some embodiments, the start capturing command specifies a condition for starting to log the asset data. In this case, the start capturing command causes the telematics device to test for a particular condition. If the condition is satisfied, the telematics device starts logging the asset data. For example, the start capturing command may cause the telematics device to start capturing data when the RPM reaches 2000 rpm. In this case, the telematics device may start capturing a certain type of asset data, such as coolant temperature, when the RPM reaches 2000 rpm.

The stop capturing command instructs a telematics device coupled to a particular vehicle to stop capturing asset data. In some embodiments, the stop capturing command is matched to a previous start capturing command and accordingly cancels the matching start capturing command. In some embodiments, the stop capturing command causes the telematics device to cancel all logging that was caused by start capturing commands. In some embodiments, the stop capturing command has a condition for stopping logging. For example, the start capturing command may cause the telematics device to start capturing when the RPM reaches 2000 rpm, while the stop capturing command may cause the telematics device to stop capturing when the RPM reaches 3000 rpm. This use case captures events of interest in a particular RPM range such as 2000 rpm to 3000 rpm.

The log upload command instructs a telematics device coupled to a particular vehicle to upload logged data, such as asset data and debug data. In some embodiments, the log upload command may request that the telematics device to upload the logged data captured in response to a particular start capturing command. In other embodiments, the log upload command causes the telematics device to upload all captured asset data. In other embodiments, the log upload command causes the telematics device to upload asset data captured in response to more than one start capturing command. The telematics device, in response to the log upload command, sends the captured (logged) asset data to the telematics server 130 over the network 50, where it may be retrieved by the application 145 on the administration terminal 140.

In the depicted embodiment of FIG. 5, the telematics server 130 receives the logging commands, such as the start capturing, the stop capturing, and the log upload commands from the administration terminal 140. The telematics server 130 determines the telematics device 200 that needs to execute the commands, and forwards the log request 510, as the log request 520 to the telematics device 200. In some embodiments, the log request 510 contains a vehicle identifier, such as a Vehicle Identification Number (VIN) identifying the vehicle from which the asset data is desired to be logged. The telematics server 130 queries the telematics database 132 using the vehicle identifier thus obtaining a device identifier for the telematics device 200 associated with the vehicle identifier specified in the log request 510. In some embodiments, where the same asset data is desired from multiple vehicles, the log request 510 contains a plurality of VINs corresponding to the multiple vehicles, which may be in the same fleet.

In an alternate embodiment, the administration terminal 140 may have previously identified the device identifier of the telematics device 200 that is execute the commands. In this case, the log request 510 contains a device identifier of the telematics device 200 instead of a vehicle identifier. In this case, the telematics server 130 forwards the log request 510 as the log request 520 fo the telematics device 200.

Figure 6:
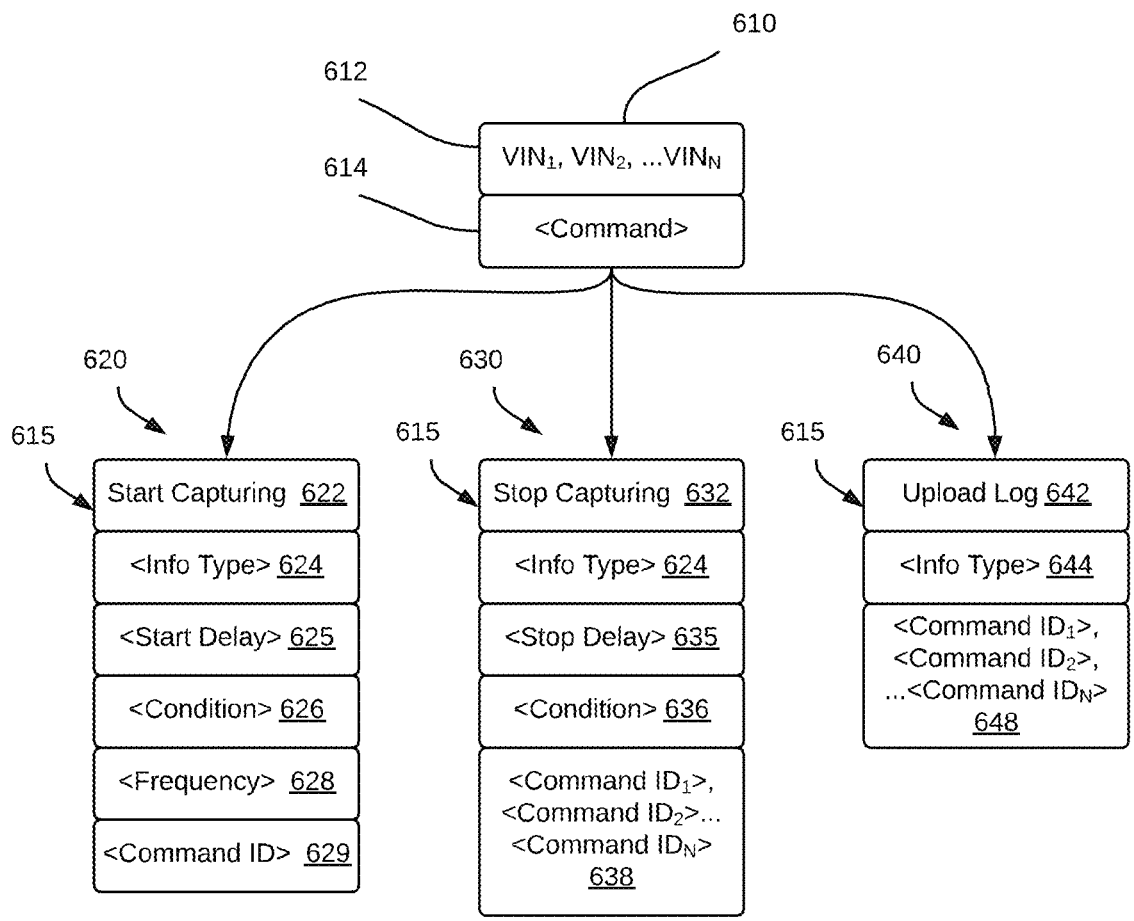
FIG. 6 is a block diagram depicting the structure of the requests to start capturing, stop capturing, and uploading logs.

FIG. 6 shows different forms of a log request 610, similar to the log request 510, in accordance with embodiments of the present disclosure. A log request may be specific to a single vehicle or to multiple vehicles. Accordingly, a log request may have a vehicle identification field 612 in which one or more vehicle identifiers are specified. In some embodiments, a VIN is used as a vehicle identifier. In the depicted embodiment the vehicle identification field 612 contains a plurality of VINs number $VIN_1$ to $VIN_N$. The vehicle identifier is used by the telematics server 130 to identify a corresponding telematics device coupled to the vehicle identified by the vehicle identifier. The other field of the log request is a command field 614 which may contain one of the start capturing, stop capturing or upload commands. Each command field 614 has a command type field 615.

For a start capturing command, the command field 614 contains a start capturing command 620 as shown. The start capturing command contains a start capturing command type 622 in the command type field 615. The start capturing command 620 contains an information type field containing the info type 624 for the asset data to be gathered (logged). The start capturing command 620 optionally contains a delay 625. The delay 625 specifies a duration that the telematics device 200 waits for before starting to log the asset data in accordance with the start capturing command. If no delay is desired, the delay 625 is set to 0. The start capturing command 620 optionally contains a condition field containing a condition 626 which triggers logging on a telematics device corresponding to a vehicle identifier specified in the vehicle identification field 612. The start capturing command optionally contains a frequency field containing a frequency 628 of gathering the requested information. The command identifier field contains a command ID 629 for the start capturing command. The command ID 629 is a unique identifier specific to the command that uniquely identifies the command to the telematics device. The command ID 629 may be matched to a command ID for the stop capturing command 630 and/or the upload log command 640.

For a stop capturing command, the command field 614 contains a stop capturing command 630 as shown. The stop capturing command 630 contains a stop capturing command type 632 in the command type field 615. In some embodiments, the stop capturing command 630 contains an information type field containing the info type 624 that the telematics device is to stop capturing. For example, the stop capturing command 630 may contain an info type 624 that refers to engine RPM. In this case, when the telematics device 200 receives the stop capturing command 630, the telematics device 200 refrains from requesting and/or logging RPM information. In other embodiments, the stop capturing command 630 contains one or more command ID(s) 638 that match command IDs 629 sent earlier in one or more start capturing commands 620. In such embodiments, the telematics device 200 refrains from continued to log data previously requested by commands having a matching command ID 629 to the command ID(s) 638. In some embodiments, the stop capturing command 630 has a condition for stopping logging of the data specified by the info type 624. For example, the condition may specify that the telematics device is to stop capturing data when the coolant temperature drops below 90 degrees Celsius. In some embodiments, the stop capturing command 630 contains a delay 625 that the telematics device 200 waits for before stopping to log asset information in accordance with the stop capturing command 630.

For an upload command, the command field 614 contains an upload log command 640 as shown. The upload log command 640 contains a log upload command type 642 in the command type field 615. In some embodiments, the log upload command contains an info type 644 that specifies the type of data that the telematics device is to upload. For example, the info type 644 may specify that all debug data is to be uploaded. Alternatively or additionally, the info type may specify that all asset data of a particular type is to be uploaded. The log upload command 40, when processed by the telematics device 200 uploads the requested data to the telematics server 130 or to an operator terminal 150. In other embodiments, the upload log command 640 contains a list of command IDs 648. In this case, the telematics device is requested to upload log data captured in response to the command IDs 648.

Turning back to FIG. 5, the telematics server 130 receives the log request 510 described above. The telematics server 130 determines a telematics device identifier coupled to the vehicle identified by the vehicle identifier specified in the vehicle identification field 612. In some embodiments, the telematics database 132 contains an entry for each vehicle identified by a vehicle identifier, the entry containing a telematics device identifier of the telematics device coupled to said vehicle. In some embodiments, the telematics device identifier is a serial number that uniquely identifies the telematics device 200. Since the telematics device contains a network interface, such as a wireless modem, communicating with the telematics device 200 requires the telematics device to have a Subscriber Identity Module (SIM). A SIM contains an international mobile subscriber identity (IMSI) which is a number that uniquely identifiers the telematics device 200 to a cellular network. The telematics server 130 may store the IMSI of the SIM installed in the telematics device 200 identified by the serial number. The IMSI is one example of a communications identifier that identifies the telematics device 200 to the network 50. Upon determining the communications identifier corresponding to the telematics device 200 coupled to the vehicle identified by the vehicle identifier specified in the log request 510, the telematics server 130 sends a log request 520 to said telematics device 200. In some embodiments, the log request 520 is identical to the log request 510. In other embodiments, the log request 510 does not have the vehicle identification field 612 as this field is utilized by the telematics server 130 to identify the telematics device 200 and is no longer needed.

At the telematics device a log manager 245 processes the log request 520. In some embodiments, the log manager immediately starts logging asset data of the type specified by the info type 624. In some embodiments, the log manager 245 waits for a duration specified by the start delay 625 before starting to log the asset data. In some embodiments, the log manager 245 evaluates the condition 626 and only logs the asset information of the info type 624 if the condition 626 is true. In some embodiments, the log manager 245 logs the asset data only once, if for example the frequency 628 is set to 0. If the frequency 628 is set to another value, then the log manager logs the asset data in accordance with the frequency 628. The frequency 628 may specify the number of times per minute the asset data of the info type 624 is requested from the vehicle coupled to the telematics device 200.

The log manager 245 also processes the stop capturing command 630. In some embodiments, the log manager 245 stops logging asset data specified by the info type 624. In some embodiments, the log manager 245 waits a duration specified by the stop delay 635 before stopping to log the asset data in accordance with the stop capturing command 630. In some embodiments, the log manager 245 evaluates the condition 636 and stops logging asset data specified by the info type 624 only if the condition 636 is true. In some embodiments, instead of stopping logging asset data and/or debug data specified by the info type 624, the logging manager 245 stops logging any asset data and/or debug data specified by previous commands denoted by the command ID(s) 638.

The log manager 245 also processes the upload log command 640. In some embodiments, the upload log command 640 specifies an info type 644 for the asset data or the debug data logged by the telematics device 200. In such embodiments, all log data specified by the info type 644 is uploaded to a remote device such as the telematics server 130 in the form of a log 530. In other embodiments, the upload log command 640 contains one or more log command identifiers, such as command IDs 648. In such embodiments, the telematics device 200 sends log data captured in response to start capturing commands 620 containing the one or more command IDs in the log 530.

The telematics server 130 receives the log 530 from the telematics device 200. In some embodiments, the telematics server 130 saves the log 530 in the telematics database 132. In some embodiments, the telematics server 130 pushes the log 540, which contains substantially the same information as the log 530, to the administration terminal 140 where it may be access by the application 145. In other embodiments, the telematics server 130 sends a notification to the administration terminal 140 indicating that the log 540 is available for access thereby. In response, the application 145 may pull the log 540 from the telematics server 130.

Figure 7:
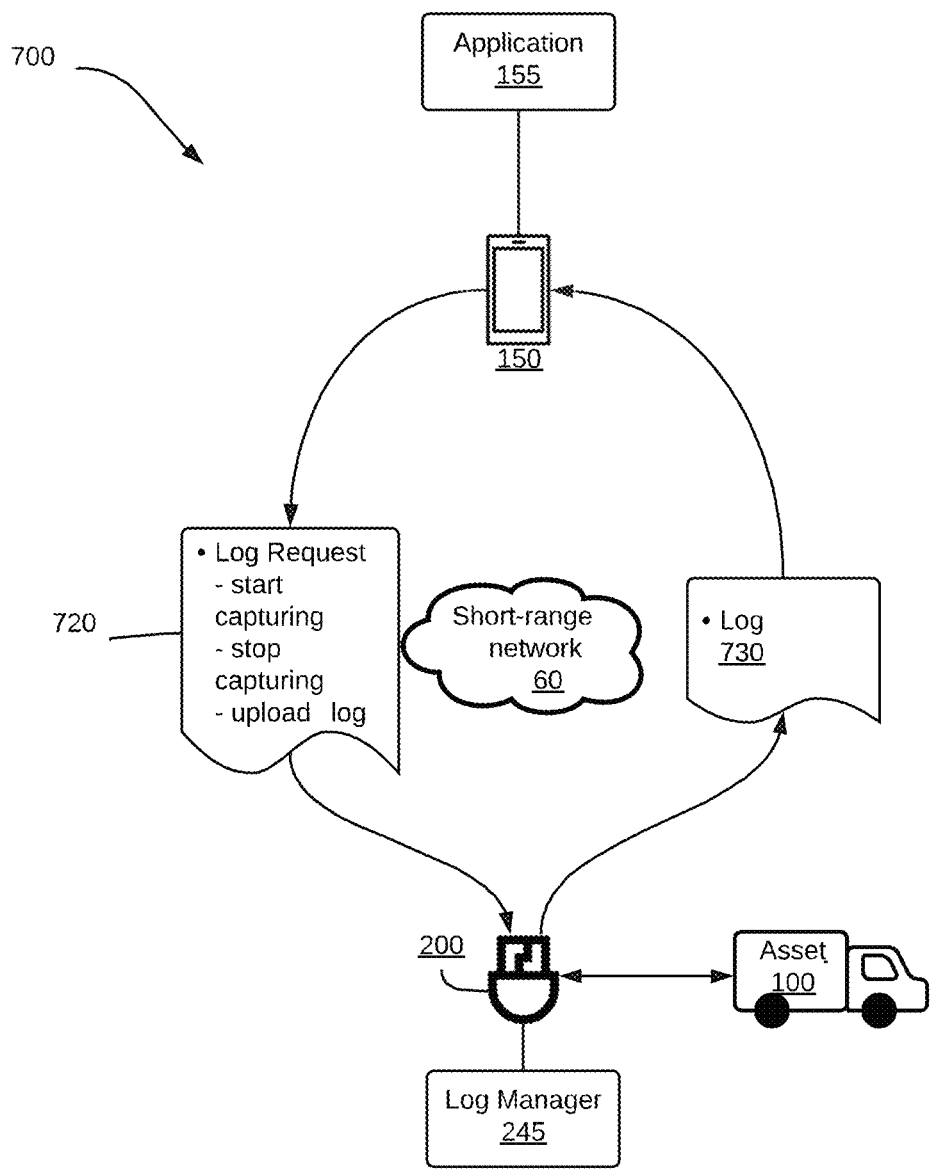
FIG. 7 is a diagram depicting a system for initiating capturing, stopping capturing, and uploading logs on a telematics device over a short-range communications network.

While the logging may be initiated at an administration terminal 140 as described above, this is not necessarily the case. An alternative embodiment is shown in FIG. 7. The system 700 of FIG. 7 is comprised of an operator terminal 150 in communication with a telematics device 200 over a short-range wireless communications network ("short-range network") 60. For example, the operator terminal 150 may be paired to the telematics device 200 over a Bluetooth™ connection. In the depicted embodiment, the application 155 may send a log request 720 the telematics device 200 instructing the telematics device 200 to start capturing. The log request 720 may have a similar format to the log request 610 except that a vehicle identifier may not be needed since there is only one telematics device 200 paired to the operator terminal 150. Accordingly, the log request 720 may still contain one of a start capturing command 620, a stop capturing command 630, and an upload log command 640. The start capturing command 620 and the stop capturing command 630 are processed in the same manner as described above with reference to FIG. 5. The upload log command 640 uploads the log 730, over the short-range network 60 to the operator terminal 150.

Triggering Actions

In addition to capturing log data, it may sometimes be desirable to trigger certain actions in response to certain vehicle events as reported in the captured asset data 112. Additionally or alternatively, it may be desirable to trigger certain actions in response to certain debug data. In some cases a telematic device 200 runs firmware on the controller 230 in "bare metal" mode, i.e., without an operating system. In other cases, a telematics device 200 may have an operating system, and may firmware modules in the form of drivers and/or applications in conjunction with the operating system. In the latter case, the telematics device 200 may run one or more applications that configure the telematics device to perform certain actions in response to vehicle events and/or debug events. The telematics device may run a module acting as a data trigger manager. The data trigger manager is a firmware module that manages triggering actions in response to events.

Figure 8:
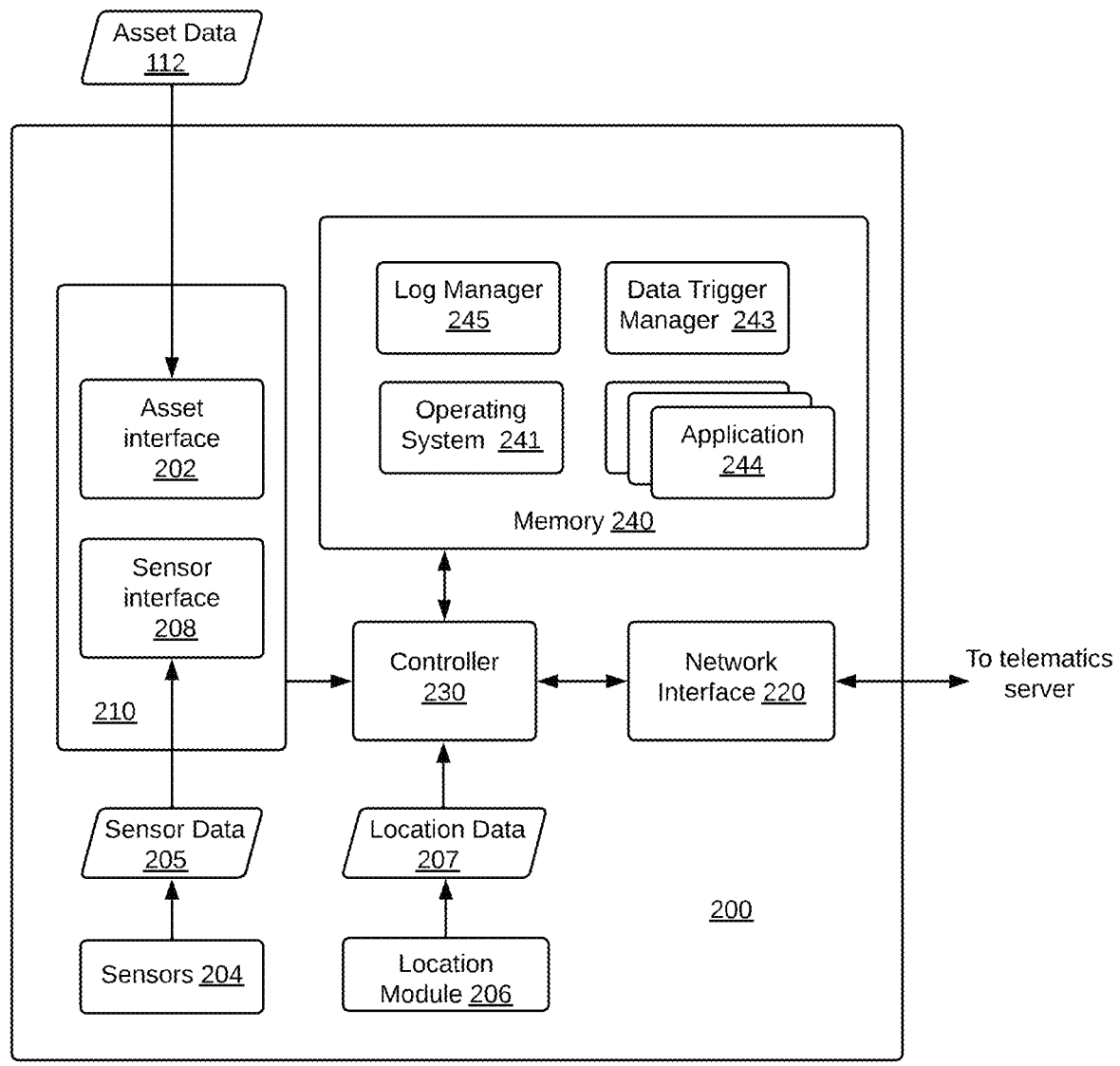
FIG. 8 is a block diagram of a telematics device including a log manager, a data trigger manager, an operating system, and an application, in accordance with embodiments of the present disclosure.

A telematics device 200 featuring an operating system 241, a log manager 245, a data trigger manager 243, and an application 244 is depicted in FIG. 8 in accordance with embodiments of the present disclosure. The telematics device 200 of FIG. 8 is similar to the telematics device of FIG. 2, but runs firmware modules from the memory 240 as shown. In an alternate embodiment (not shown), the operating system 241, the log manager 245, the data trigger manager 243, and the application 244 may reside in and execute from an internal memory of the controller 230.

The operating system 241 is an embedded operating system that handles context switching between different firmware tasks on the telematics device. Examples of an operating system include, but are not limited to, embedded Linux™, Android™, QNX™, NuttX™, and Free RTOS™.

The log manager 245 has been described above with reference to FIG. 8.

The data trigger manager 243 is a firmware module that managers action triggering in response to asset data and/or debug events. The data trigger manager 243 processes requests to add and/or remove log and trigger configurations, as well as detect trigger conditions, and perform associated actions. The operation of the data trigger manager 243 will be explained in detail below.

Figure 9A:
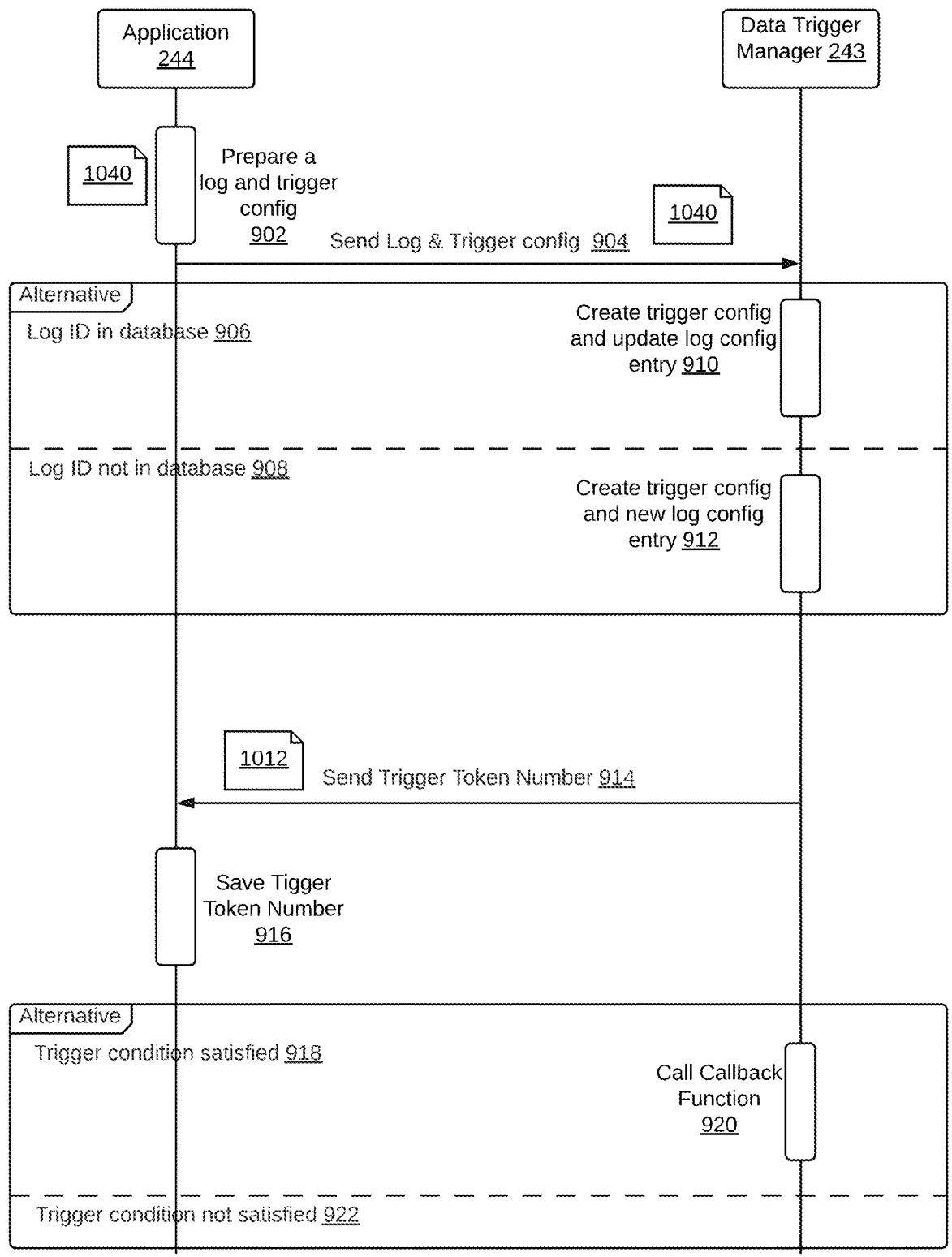
FIG. 9A is a message sequence diagram showing messaging between an application and a data trigger manager for setting up log and trigger configuration, in accordance with embodiments of the present disclosure.

The application 244 represents one or more applications that request action triggers from the data trigger manager 243. For example, an application 244 may ask the data trigger manager 243 to monitor for and detect a particular trigger condition. Additionally, the application 244 may request that the data trigger manager 243 perform an action in response to the trigger condition. FIG. 9A is a message sequence diagram showing interactions between the application 244 and the data trigger manager 243, in accordance with embodiments of the present disclosure.

At step 902, the application 244 prepares a log and trigger configuration structure. The log and trigger configuration structure ("log and trigger config") 1040 is described in detail with reference to FIG. 10A. The first field in the log and trigger config is the data trigger type 1002. The data trigger type 1002 specifies the type of data that is captured and tested for the trigger condition. For example, the data trigger type 1002 may indicate that asset data (i.e., vehicle status) is the type of data to be used in this log and trigger configuration. Alternatively, the data trigger type 1002 may indicate that debug data is the type of data to be used in this log and trigger config 1040. The next field contains the log ID 1022. The log ID is a unique value representing the data to be captured, logged, and then tested for a trigger condition. For example, the log ID may represent engine RPM, engine coolant temperature, air intake temperature, battery voltage, if is of the vehicle status type. Alternatively, the log ID may represent a debug message containing a particular string value or numerical value. The next field is the payload 1024. The payload 1024 indicates a byte sequence for identifying the desired trigger data. The mask 1026 specifies a particular mask used to extract the desired trigger data by bitwise ANDing the captured data therewith. For example, if the trigger data is present in the three lowest bytes of a 4-byte double-word, then the mask 1026 is 0x0FFF and the captured trigger data is bitwise ANDed with the mask 1026. The offset 1028 indicates an offset within the captured data where the desired trigger data can be found. For example, the value of coolant temperature may not be the first byte in coolant temperature CAN frame. The offset 1028 indicates how many bytes to skip in order to arrive at the bytes containing the desired trigger data. The length 1030 indicates the length of the desired trigger data. The trigger condition 1004 specifies the condition, with respect to the trigger data, that causes an action to be performed. For example, it may be desired to trigger an action when the RPM exceeds 5000 rpm. In this case the log ID 1022 represents RPM data. The mask 1026, the offset 1028, and the length 1030 are used to compute the RPM data. The trigger condition may be specified as ">5000" or "GT 5000" to indicate that an action should be taken if the RPM is greater than 5000 rpm. The lag time 1006 specifies a time that must elapse before the data trigger manager checks for the trigger condition. The callback function 1008 is a function that the data trigger manager 243 is to call if the trigger condition is satisfied. In some embodiments, the callback function is replaced by a message type. In this case, the data trigger manager sends a message of the message type to the application 244 when the trigger condition is satisfied.

Turning back to FIG. 9A, at step 904, the application 244 sends the log and trigger config 1040 to the data trigger manager 243. In some embodiments, the data trigger manager 243 provide an application programming interface (API) that allows the application 244 to pass the log and trigger config 1040 to the data trigger manager 243. This embodiment works in environments where there is no operating systems, also known as programming to the bare metal. In other embodiments, the application 244 may package the log and trigger config 1040 in an operating system message sent to the data trigger manager 243. The data trigger manager 243 receives the log and trigger config 1040.

The data trigger manager 243 checks whether a log configuration structure (log config) exists for the specified log ID. For example, the data trigger manager 243 may check a database or a data structure that hold all log configurations for a log configuration having the same log ID as the log ID 1022.

If the log ID 1022 is found in the database, as shown in block 906, then the action of step 910 is performed. At step 910, a trigger configuration ("trigger config") containing the fields 1024, 1026, 1028, 1030, 1004, 1006, and 1008 is created. Additionally, the log config entry containing the log ID 1022 is updated to be associated to the newly created trigger config. Examples of a trigger config are the trigger config 1000A and the trigger config 100B of FIG. 10B. FIG. 10B is described below.

If the log ID 1022 specified in the log and trigger config 1040 is not found in the database, then control goes to block 908. At step 912, a log config entry containing the log ID 1022 is created. A trigger config containing the fields 1024, 1026, 1028, 10330, 1004, 1006, and 1008 is created. Additionally, Additionally, the created log config entry containing the log ID 1022 is updated to be associated with the newly created trigger config.

Figure 9B:
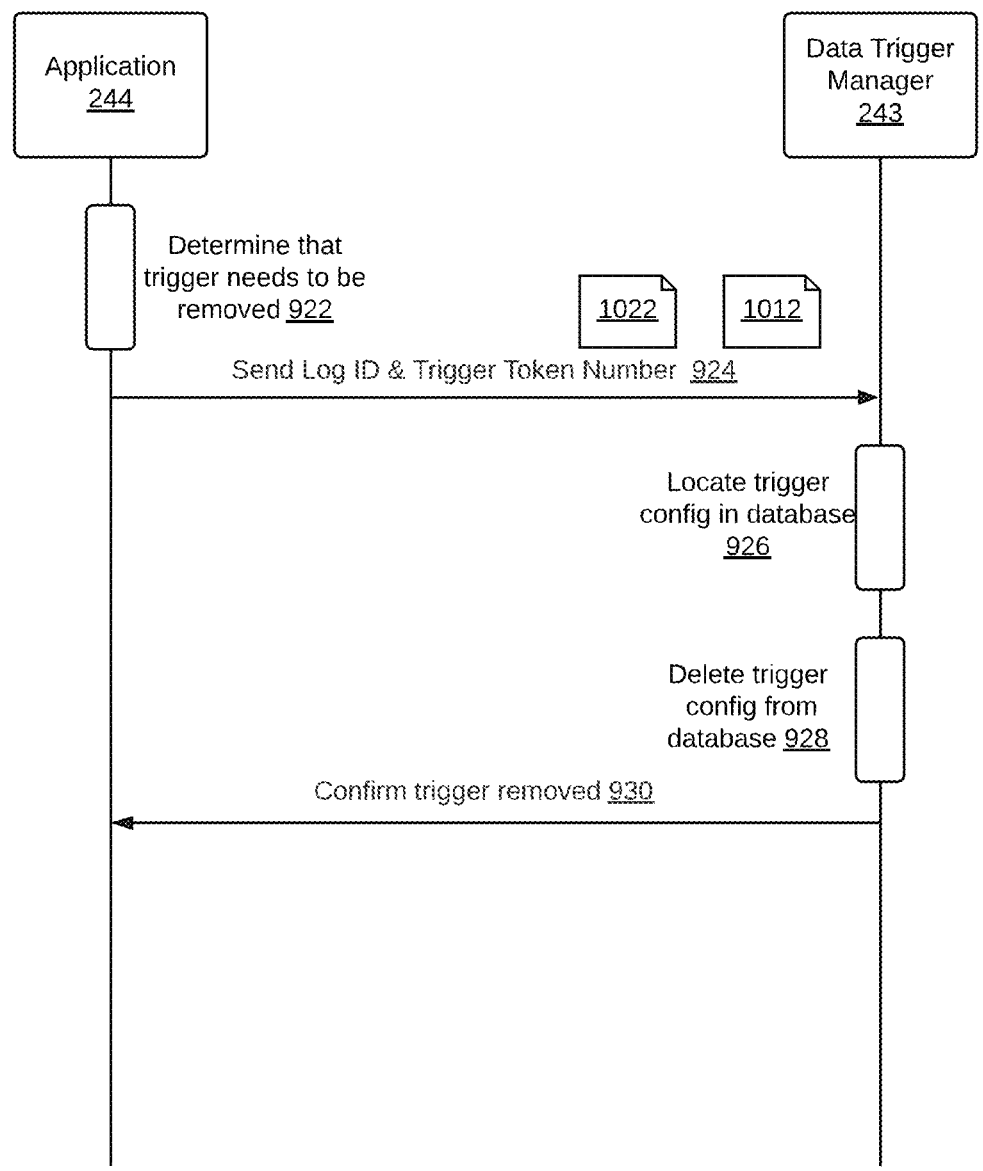
FIG. 9B is a message sequence diagram showing messaging between an application and a data trigger manager for removing a trigger configuration, in accordance with embodiments of the present disclosure.

One of the fields of the trigger config, such as the trigger config 1000A, is the trigger token number. The trigger token number is a unique identifier that identifies the trigger configuration. At step 914, the data trigger manager 243 sends the trigger token number 1012 to the application 244. The application 244 receives the trigger token number. At step 916, the application 244 saves the trigger token number. The trigger token number 1012 can be used by the application 244 to remove a trigger configuration from the data trigger manager 243 as will be described next with reference to FIG. 9B.

At step 918, the data trigger manager 243 determines that the trigger condition of the trigger config is satisfied. In response, at step 920 the data trigger manager 243 calls a callback function corresponding to the trigger condition. Alternatively, if the data trigger manager 243 determines that the trigger condition of the trigger config is not satisfied, then no action is taken.

At step 922, the application 244 determines that a particular trigger condition for a particular log ID is no longer needed and should be removed from the data trigger manager 243. As discussed above, every trigger config is uniquely identified by a trigger toke number. As such, at step 924 the application 244 sends both the Log ID 1022 and the trigger token number 1012 corresponding to the trigger config that is to be removed to the data trigger manager 243. The data trigger manager 243 receives the trigger token number 1012.

At step 926, the data trigger manager 243 locates the trigger config corresponding to the trigger token number 1012 and the log ID 1022 in the database.

At step 928, the data trigger manager 243 removes the trigger config from the database.

At step 930, the data trigger manager 243 confirms that the trigger config has been removed. In some embodiments the data trigger manager 243 sends a message to the application 244 indicating that the trigger config has been removed. In other embodiments, the application 244 calls an API of the data trigger manager 243 passing the Log ID 1022 and the trigger token number 1012. In this case, the data trigger manager 243 confirms the deletion of the trigger config by return code of the API.

The same application (or different applications for that matter) may configure the data trigger manager 243 to perform actions in response to different trigger conditions for the same Log ID. For example, the application 244 may ask the data trigger manager 243 to perform one action when the RPM is greater than 5000 rpm and another action if the RPM is lower than 1000 rpm. Both trigger configurations are associated with the same Log ID (which corresponds to vehicle RPM). As such, there is a one-to-many relationship between the log config as identified by the Log ID, and the trigger config as identified by the trigger token number 1012. For example, with reference to FIG. 10B, there is shown a log config 1020 associated with two trigger configurations, namely trigger config 1000A and trigger config 1000B. The trigger configs may be stored in a trigger config list and the log config 1020 contains a trigger list 1055 field that points to the start of the trigger config list.

The fields 1024, 1026, 1028 and 1030 of the log config 1020 determine how the trigger data is extracted as discussed above. The fields of the trigger config structures determine the trigger condition and the action to be taken. The trigger condition 1004, lag time 1006, and callback function 1008 have been discussed above. The additional fields are discussed herein. For the lag time 1006, the data trigger manager 243 uses a timer. The field timer 1010 may contain the value to which a timer can be set to create the lag time 1006. The timer used may be a hardware timer that is part of or external to the controller 230. Alternatively, the timer may be a software timer provided by the operating system 241. In some embodiments, the timer creates an event once it has expired. In response to the timer expiry event, the data trigger manager 243 tests the trigger condition 1004 and if true, performs an associated action such as calling the callback function 1008. In some embodiments, timers do not generate events once they expire. In such case, the flag time on flag 1014 may be periodically polled by the data trigger manager 243 to determine whether the timer has expired and that the data trigger manager 243 may test the trigger condition 1004.

In some cases, the data associated by a Log ID 1022 may be extracted in different ways. For example, the telematics device 200 may contain different ways of obtaining a vehicle parameter such as the RPM, based on the vehicle make and model. As such, the payload 1024, mask 1026, offset 1028, and length 1030 may vary for a Log ID 1022. In this case, the payload 1024, mask 1026, offset 1028, and length 1030 are stored as part of the data trigger config structure associated with a particular trigger condition. This is shown in FIG. 10C wherein each of the trigger config 1000A and the trigger config 1000B stores a payload 1024, a mask 1026, an offset 1028, and a length 1030 although both trigger conditions correspond to the same log ID.

Figure 11:
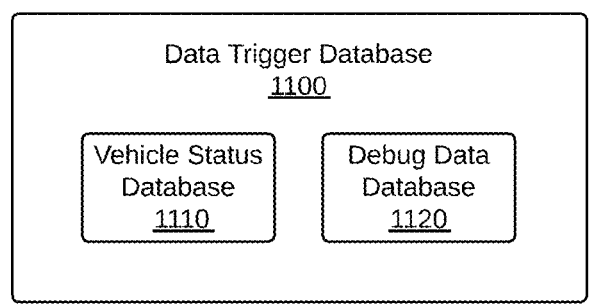
FIG. 11 is a block diagram of a data trigger database comprising two databases for vehicle status and debug data, in accordance with embodiments of the present disclosure.

As discussed earlier, the data trigger manager 243 may trigger actions based on conditions related to distinct types of data, such as vehicle status (asset data) and debug data. In this case, the data trigger manager 243 may maintain multiple databases, one for each type of trigger data. FIG. 11 shows a data trigger database 1100 comprised of two databases; a vehicle status database 1110 and a debug data database 1120. When the application 244 provides a log and trigger config 1040 to the data trigger manager 243, the data trigger manager 243 examines the data trigger type 1002 to determine which database to use. For example, if the data trigger type 1002 indicates vehicle status, then the data trigger manager uses the vehicle status database 1110. Conversely, if the data trigger type indicates debug data, then the data trigger manager uses the debug data database 1120.

Figure 12:
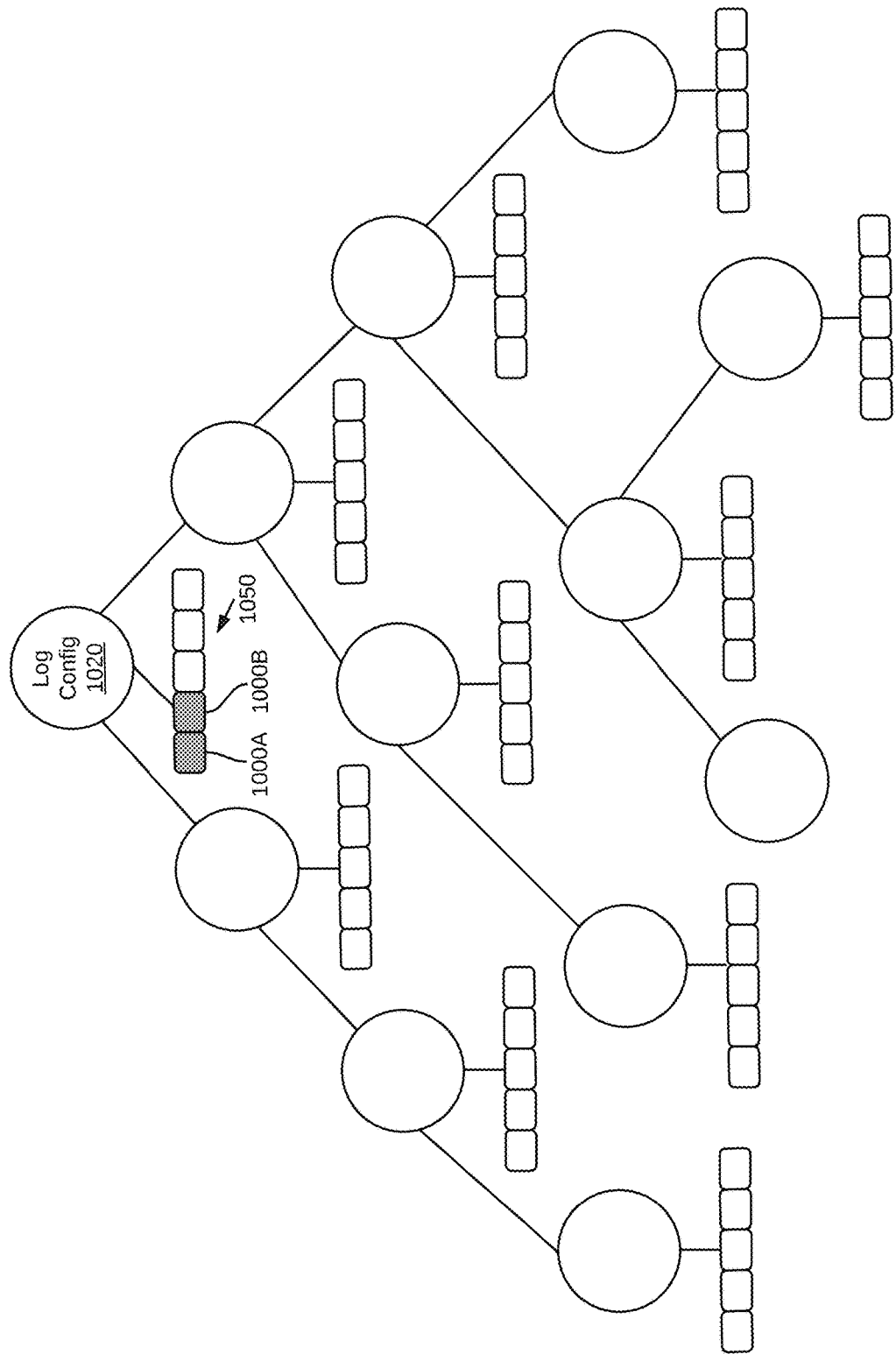
FIG. 12 depicts an AVL tree where each AVL tree node represents a log configuration and each node is associated with a plurality of trigger configurations, in accordance with embodiments of the present disclosure.

The implementation of the data trigger databases may take a number of forms and is not limited to a particular embodiment. One preferred embodiment, shown in FIG. 12, uses an AVL tree. Each node of the AVL tree stores a log config 1020. The key used to create the tree is the Log ID field of the log config 1020. As discussed, there is a one-to-many relationship between the log config 1020 and the trigger configs. As such, one possible implementation is to maintain a list of trigger configs associated with each log config 1020. As shown in FIG. 12, the top node has a log config 1020 and has a trigger config list 1050 associated therewith. The trigger config list 1050 has two trigger configs allocated, namely the trigger config 1000A and the trigger config 1000B. The trigger config list 1050 may be implemented as an array, a dynamic array, a linked list, or any suitable data structure.

The database may start with some nodes or may be empty and is created piecemeal as one or more applications 244 pass log and trigger configs to the data trigger manager 243. If a log config node exists for a particular log ID, then a trigger config is allocated and added to the trigger config list 1050 associated with that particular log config node. If a log config does not exist for a particular log ID, then a new node is allocated in the AVL tree by the data trigger manager 243. The node is created in the proper branch of the AVL tree as ordered by the log ID. The AVL tree may need to be rebalanced after the node is created, as known in the art. When the application 244 requests that a particular trigger config is removed, the data trigger manager 243 first locates the log config node having the log ID corresponding to the trigger config. Then the data trigger manager 243 locates the trigger config identified by the trigger token number specifies in the delete request in the trigger config list 1050. The trigger config is then removed from the trigger config list 1050. In some embodiments, when a log config node does not have any trigger configs in the trigger config list 1050, the log config node 1020 is removed. In other embodiments, even when a log config node does not have any trigger configs, the log config node 1020 is retained in the AVL tree for future use. In some embodiments, the log config nodes are retained and a time stamp of the last use is recorded in the log config node 1020. As the AVL tree grows to a particular size threshold, or the memory or storage holding the AVL tree goes low on space, the data trigger manager 243 may delete the oldest log config nodes 1020 and rebalance the AVL tree if necessary.

While the above embodiment has utilized an application 244 to configure the data trigger manager 243, the above embodiment assumes that the application 244 is configured to provide one or more log and trigger config 1040 to the data trigger manager 243. In other embodiments, it is desired to be able to specify new triggers and actions on the fly while the telematics device 200 is deployed in the field, such as in a vehicle. In this case, the application 244 may receive a log and trigger config that was sent by a remote device. The application 244 may then provide a modified version of the log and trigger config to the data trigger manager 243 to configure the data trigger manager 243. A system that allows remote trigger and action management is depicted in FIG. 13.

Figure 13:
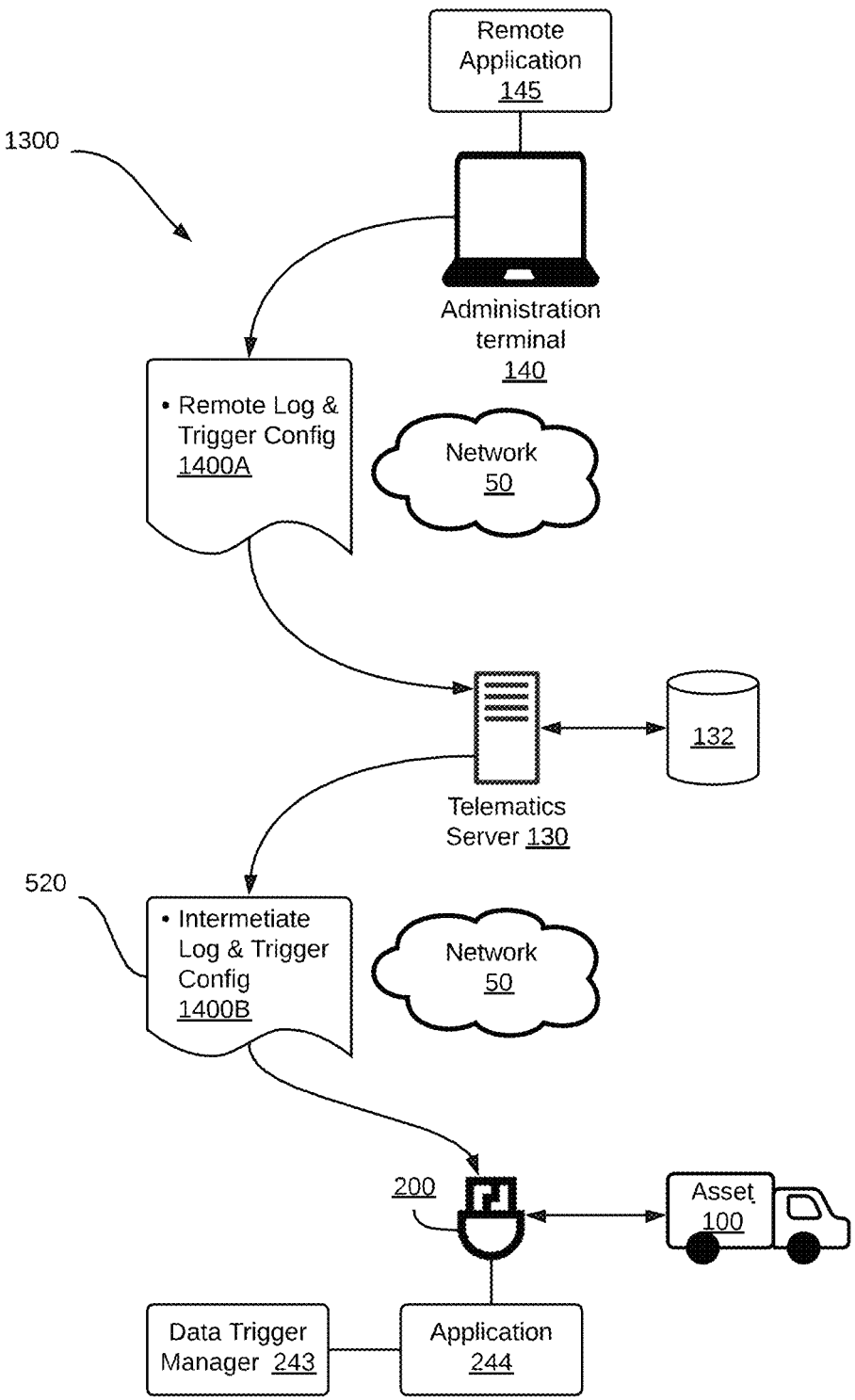
FIG. 13 depicts a telematics system that allows a remote application to configure a telematics device using a remote log and trigger configuration, in accordance with embodiments of the present disclosure.
Figure 14A:
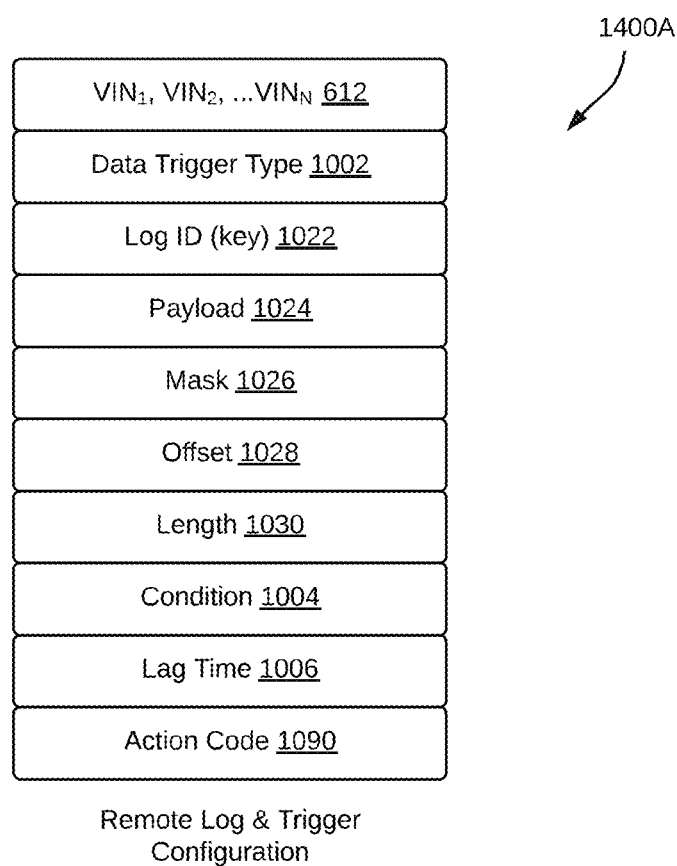
FIG. 14A depicts the structure of a remote log and trigger configuration, in accordance with embodiments of the present disclosure.

The system 1300 of FIG. 13 contains substantially similar components to the system of FIG. 5 with some differences. The administration terminal 140 is running a remote application 145. The remote application 145 is for providing a remote long and trigger config 1400A. In some embodiments, the remote application 145 displays a user interface that a fleet manager 20 can use to specify log and trigger configuration parameters. For example, the user interface may allow selecting a vehicle status parameter to use, and specify a trigger condition for that vehicle status parameter. The remote application 145 prepares a remote log and trigger config 1400A as shown in FIG. 14A.

Figure 10A:
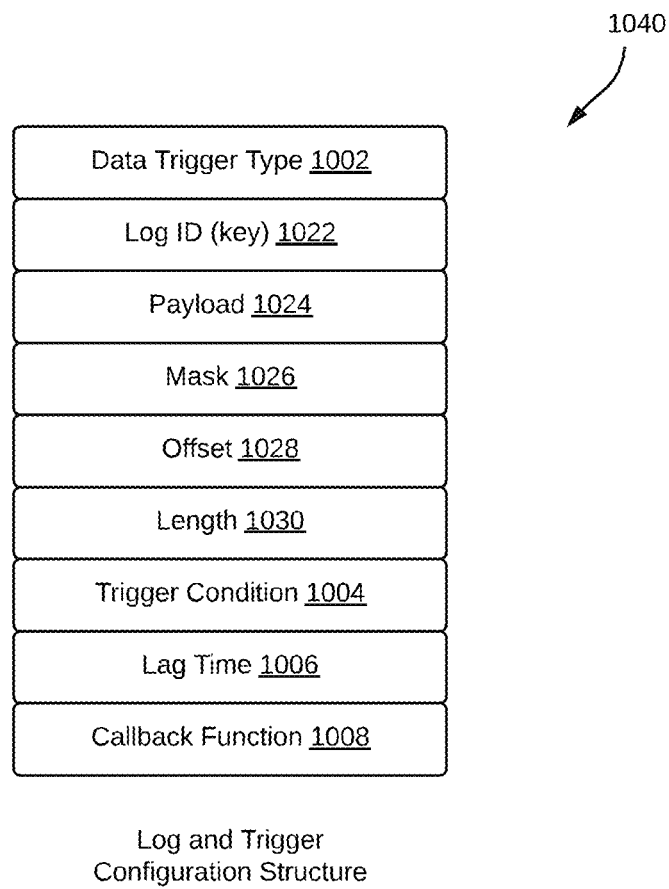
FIG. 10A depicts a log and trigger configuration structure that may be sent by an application to a data trigger manager, in accordance with embodiments of the present disclosure.
Figure 10B:
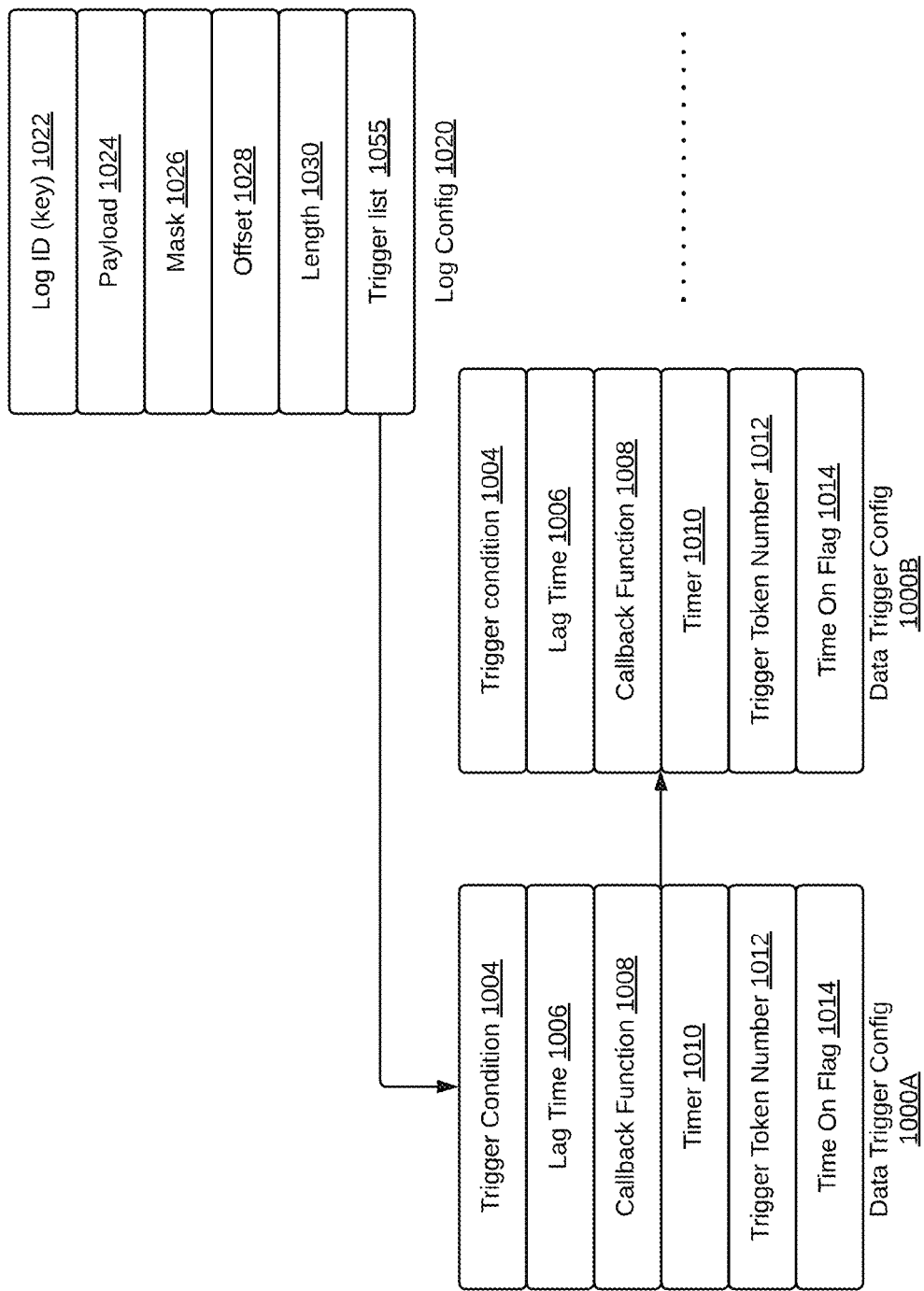
FIG. 10B depicts a log configuration and two associated trigger configurations, in accordance with embodiments of the present disclosure.
Figure 10C:
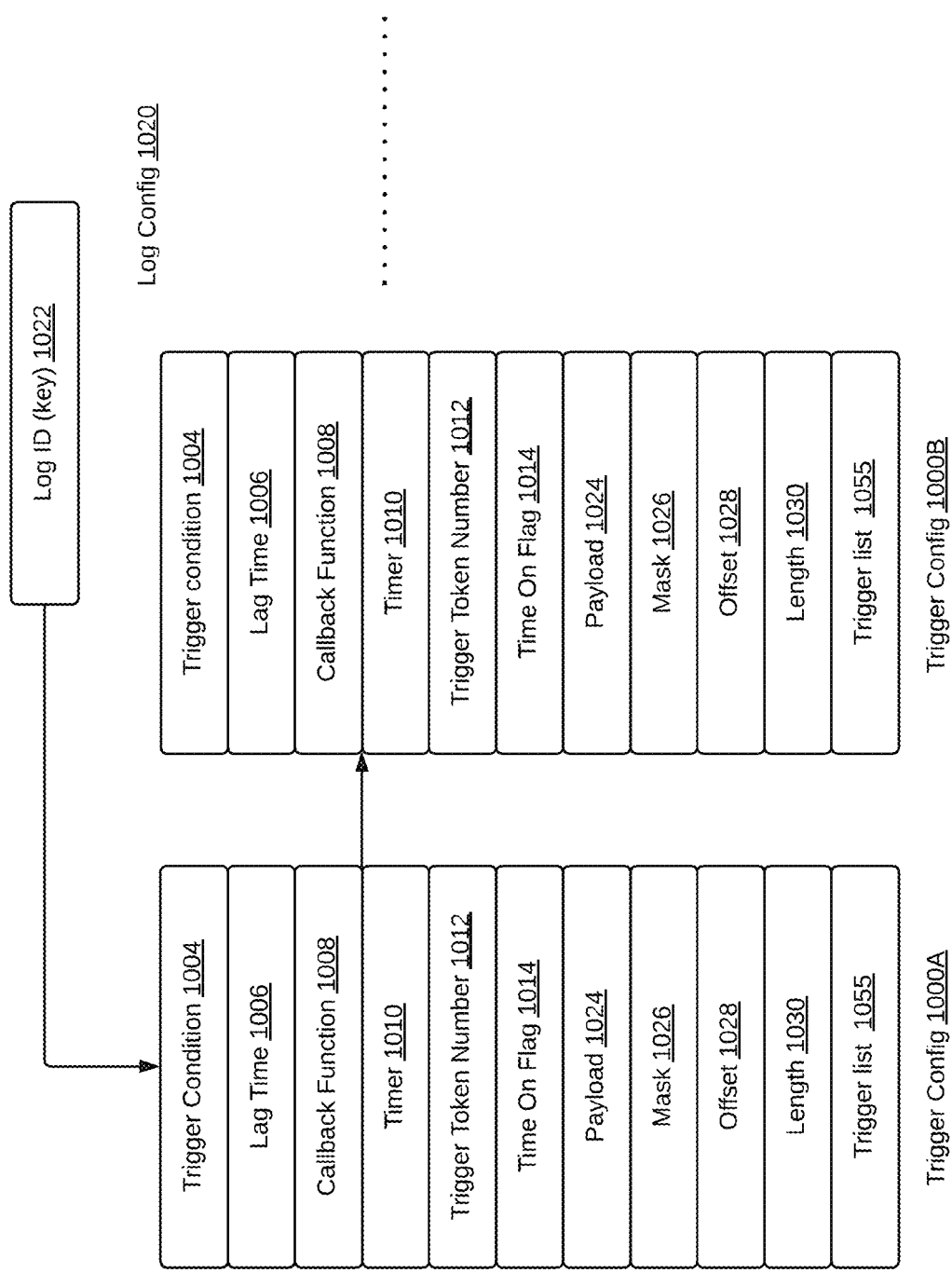
FIG. 10C depicts another log configuration and two associated trigger configurations, in accordance with other embodiments of the present disclosure.

The remote log and trigger config 1400A is substantially similar to the log and trigger config 1040 of FIG. 10A with some differences. The log and trigger config 1400A adds a vehicle identification field 612 described above to identify the vehicle for which the log and trigger config is set. The log and trigger config 1400A does not have a callback function field or any field that specifies an action. Instead the remote log and trigger config 1400A has an action code 1090. The action code 1090 is to be converted by the application 244 to a callback function or a message as described below.

Figure 15:
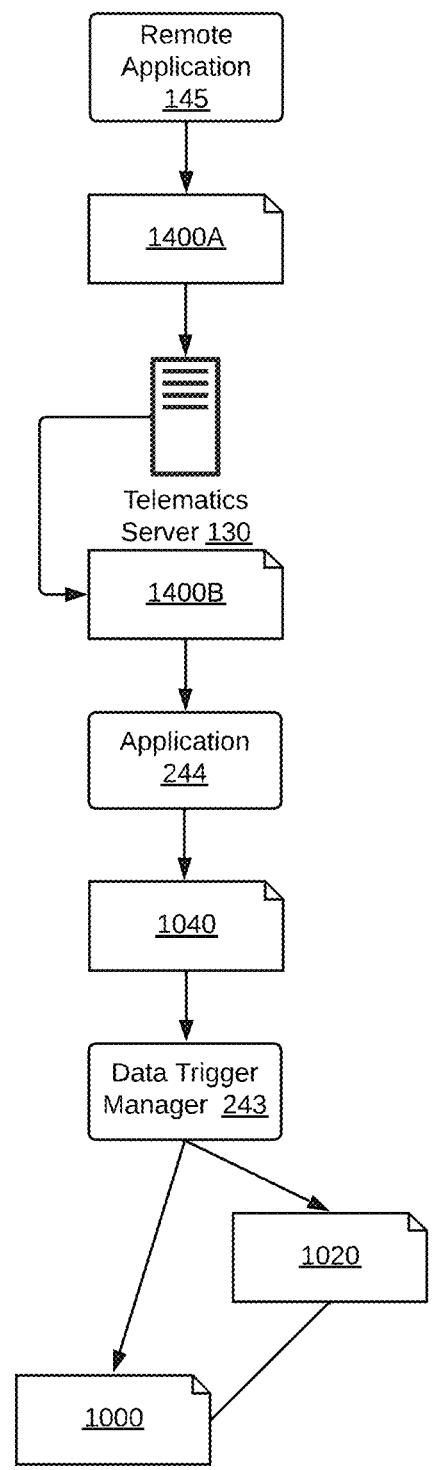
FIG. 15 is a data flow diagram showing the flow of a remote log and trigger configuration via the telematics server until it reaches the data trigger manager of a telematics device, in accordance with embodiments of the present disclosure.

Turning back to FIG. 13 and also with reference to FIG. 15, the remote log and trigger config 1400A is sent, by the remote application 145 on the administration terminal 140 to the telematics server 130 over the network 50.

Figure 14B:
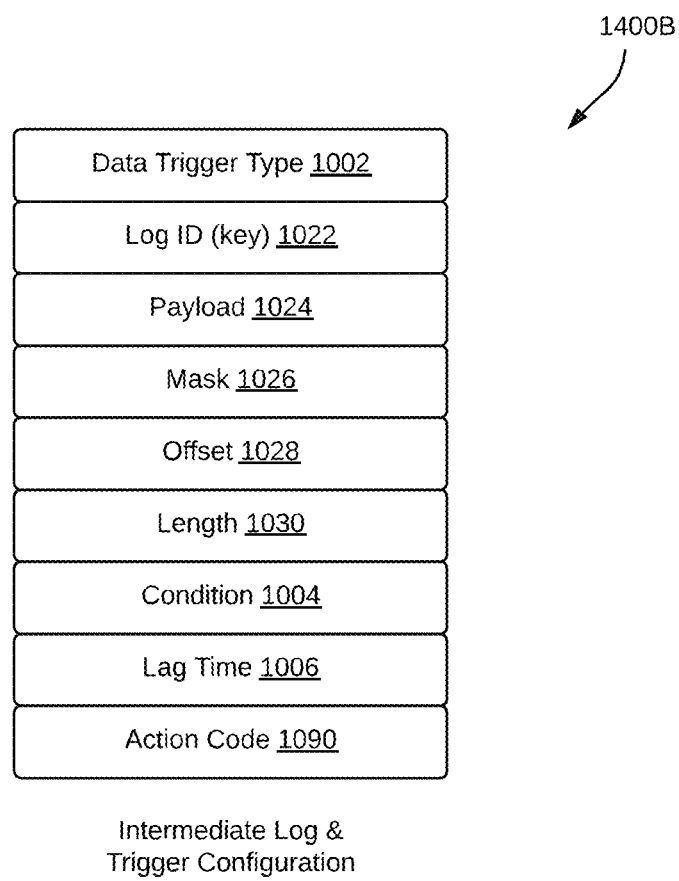
FIG. 14B depicts the structure of an intermediate log and trigger configuration, in accordance with embodiments of the present disclosure.

The telematics server 130 uses the vehicle identification field 612 to determine the telematics device 200 that corresponds to the vehicle identified in the vehicle identification field 612. As discussed earlier, the telematics server 130 may query the telematics database 132 to determine an identity of the telematics device 200 to which the vehicle identified by the vehicle identification field 612 is coupled. The telematics server 130 creates an intermediate log and trigger config 1400B, shown in FIG. 14B, that is similar to the remote log and trigger config 1400A but does not have a vehicle identification field 612. The telematics server 130 sends the intermediate log and trigger config 1400B, over the network 50, to the telematics device 200 identified based on the vehicle identification field 612.

The Application 244, running on the telematics device 200, receives the intermediate log and trigger config 1400B. The application 244 prepares a log and trigger config 1040, described in FIG. 10A above, based on the intermediate log and trigger config 1400B. The application 244 converts the action code 1090 to a trigger action such as a callback function or a message type. For example, the application 244 may contain a table mapping the action codes 1090 to functions containing code that performs the action specified by the action code 1090. In some embodiments, when the application 244 prepares the log and trigger config 1040, the application 244 consults the table and obtains the address of the function corresponding to the action code 1090 and uses that function as the callback function 1008. In another embodiment, the application 244 may contain a table that maps the action codes 1090 to message types. In this case, the prepared log and trigger config 1040 contains a message type to be used by the data trigger manager 243 to notify the application 244 of the trigger condition. In such embodiments, the application 244 checks for messages of distinct types and performs an action in response to receiving a message from the data trigger manager 243. The action being dependent on the message type.

Figure 16:
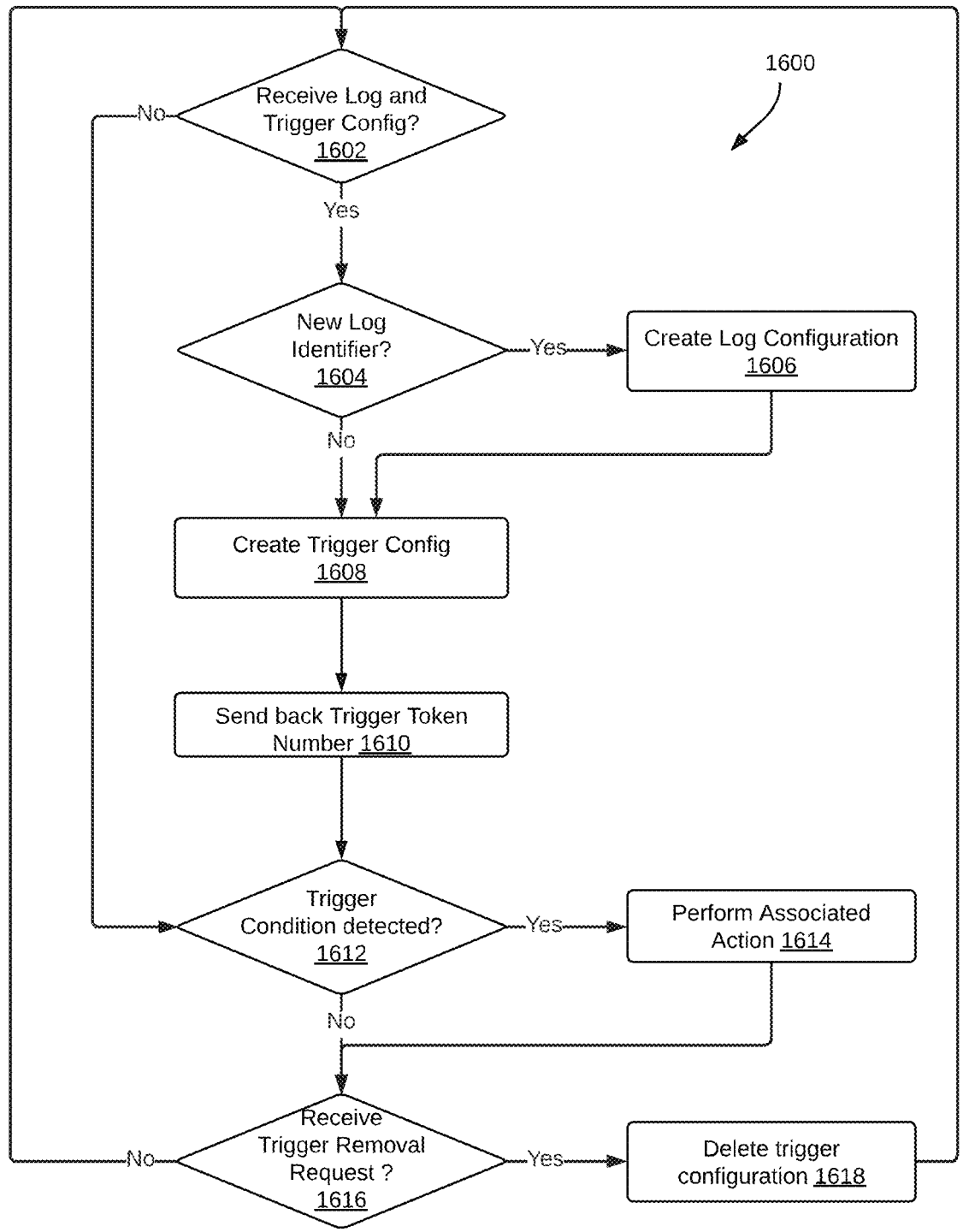
FIG. 16 is a method by a telematics device, in accordance with embodiments of the present disclosure.

FIG. 16 depicts a method 1600, by the data trigger manager 243 running on the telematics device 200. The method 1600 starts at step 1602.

At step 1602, the data trigger manager 243 receives a log and trigger config, such as the log and trigger config 1040. In some embodiments, the log and trigger config is received from an application via an operating system message. In other embodiments, the log and trigger config is received from an application that has called an API call of the data trigger manager 243 and provided the log and trigger config as a parameter to the API call.

At step 1604, the data trigger manager 243 checks whether the log identifier field in the log and trigger config contains a new log identifier that has not been previously saved in the data trigger manager 243, for example in a database thereof. In some embodiments, the data trigger manager 243 stores the log configs in an AVL tree. In such embodiments, the data trigger manager 243 traverses the nodes of the AVL tree searching for log config nodes containing a log ID having the same value as the log ID 1022 in the log and trigger config 1040. If the data trigger manager 243 does not find a log config node containing the log ID 1022, then the data trigger manager 243 determines that the log and trigger config 1040 contains a new log identifier and control goes to step 1606. If the data trigger manager 243 finds a log config node 1020 containing the log ID 1022, then the data trigger manager 243 determines that the log and trigger config 1040 contains an existing log identifier, and control goes to step 1608.

At step 1606, the data trigger manager 243 adds a log config entry in the data trigger database 1100, the long config entry containing the log ID 1022 specified in the log and trigger config 1040. In some embodiments, the data trigger database 1100 is comprised of a plurality of databases based on the data trigger type. In such embodiments, the data trigger manager 243 checks the data trigger type 1002 and selects the appropriate database. For example, if the data trigger type 1002 denotes a vehicle status log config, then the data trigger manager 243 adds the new log config entry in the vehicle status database 1110. Alternatively, if the data trigger type 1002 denotes debug data, then the data trigger manager 243 adds the new log config entry 1020 in the debug data database 1120. In some embodiments, the vehicle status database 1110 and the debug data database 1120 are implemented as AVL trees. In such case the AVL tree is sorted based on a key. The key for the data trigger database AVL tree is the log ID 1022. As such the data trigger manager 243 creates a log config node 1020 at the proper position in the AVL tree based on the value of the log ID 1022. After the log config node 1020 has been created, control goes to step 1608.

At step 1608, a trigger config 1000 is added to the log config node 1020. The data trigger manager 243 creates a trigger config list 1050 for each log config node 1020. For a newly created node, such as a newly created log config node in step 1606, the data trigger manager 243 creates a trigger config list 1050 that is initially empty. For an existing log config node 1020, a trigger config list 1050 already exists as it would have been created initially by the data trigger manager 243 when that log config node 1020 was created. The trigger config list 1050 is identified in the trigger list 1055 field of the log config 1020.

At step 1608, the data trigger manager creates a trigger config 1000 entry in the trigger config list 1050, such as the trigger config 1000A or the trigger config 1000B. The trigger config list 1050 may be a linked list, an array, a queue, a vector, or the like. In some embodiments, the trigger config entries in the trigger config list are ordered by the trigger token number. In creating the trigger config entry, the data trigger manager 243 creates a trigger token number 1012 which is unique for each trigger config 1000. The trigger token number 1012 uniquely identifies the trigger config 1000. Multiple applications 244 or the same application 244 may request multiple triggers and actions for the same trigger data identified by the log ID. As such, a trigger token number 1012 is needed to identify each trigger configuration.

At step 1610, the data trigger manager 243 sends the trigger token number to the application 244. In some embodiments, the data trigger manager 243 sends an operating system message to the application 244, the message containing the trigger token number 1012. In other embodiments, the data trigger manager 243 returns the trigger token number 1012 as part of an API call that the application 244 makes in order to pass the log and trigger config 1040 to the data trigger manager 243. In other embodiments, the application 244 may explicitly call another API call to retrieve the trigger token number 1012.

At step 1612, the data trigger manager 243 checks whether a trigger condition corresponding to the newly created trigger config 1000 is satisfied. If the trigger condition is satisfied, control goes to step 1614. If the trigger condition is not satisfied, then control goes to step 1616.

At step 1614, the data trigger manager 243 performs the action associated with the trigger condition specified by the trigger config. In some embodiments, the data trigger manager 243 calls the callback function 1008 specified in the trigger config 1000. In other embodiments, the data trigger manager 243 sends a message to the application 244 causing the application 244 to execute an action for the trigger config. After the action is performed, control goes to step 1616.

At step 1616, the data trigger manager 243 checks whether it has received a trigger removal request for a trigger config 1000. The trigger removal request contains a log ID 1022 and a trigger token number 1012. Control goes to step 1618.

At step 1618, the data trigger manager 243 deletes the trigger config corresponding to the Log ID 1022 and the trigger token number 1012. First, the data trigger manager 243 uses the log ID 1022 to locate the log config corresponding to the trigger to be removed in the data trigger database 1100, or one of the vehicle status database 1110 and the debug data database 1120. If the data trigger database is implemented as an AVL tree, the data trigger manager 243 traverses the tree using the log ID 1022 as a key and locates the log config node containing the log ID 1022. Once the log config 1020 has been located, the data trigger manager traverses the trigger config list 1050 to locate the trigger config 1000 containing the trigger token number 1012. Once found, the trigger config 1000 containing the trigger token number 1012 is removed from the trigger config list 1050. In some embodiments, the data trigger database 1100 is not implemented as an AVL but rather as a relational database table. In such embodiments, the trigger config 1000 may be selected based on the condition that the log config contains the log ID 1022 and the trigger config contains a trigger token number 1012. For example, an SQL SELECT statement including the condition that Log ID is the Log ID 1022 and that the trigger token number is the trigger token number 1012 may be used. After deleting the trigger config 1000, control goes back to the top at step 1602.

Although in FIG. 8, the log manager 245 and the data trigger manager 243 were shown as separate entities, they may be combined into one. For example, the action taken by the data trigger manager when a particular trigger condition is satisfied may be to log the trigger data into storage. Similarly, deleting a trigger configuration may stop the logging data related to that trigger condition.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in a telematics device coupled to an asset communications bus of a vehicle, the method comprising:
   receiving a log and trigger configuration;
   in response to determining that the log and trigger configuration contains a new log identifier, creating a log configuration based on the log and trigger configuration;
   in response to determining that the log and trigger configuration contains an existing log identifier, identifying the log configuration associated with the existing log identifier;
   creating a trigger configuration including a trigger condition and an associated action;
   associating the trigger configuration with the log configuration; and
   in response to detecting the trigger condition, performing the associated action.

2. The method of claim 1, further comprising in response to receiving a trigger removal request, deleting the trigger configuration.

3. The method of claim 1, wherein creating the log configuration comprises creating an entry for storing the log configuration in a database.

4. The method of claim 1, wherein creating the log configuration comprises creating an AVL tree node in an AVL tree for storing the log configuration.

5. The method of claim 4, wherein associating the trigger configuration with the log configuration comprises adding the trigger configuration to a list connected to the AVL tree node.

6. The method of claim 4, wherein the log and trigger configuration includes a data trigger type, and the AVL tree is selected from a plurality of AVL trees based on the data trigger type.

7. The method of claim 1, wherein detecting the trigger condition comprises capturing asset data from the vehicle via the asset communications bus and evaluating the trigger condition for the asset data.

8. The method of claim 1, wherein detecting the trigger condition comprises evaluating the trigger condition for debug data generated by the telematics device.

9. The method of claim 1, wherein the log and trigger configuration comprises a callback function, and wherein performing the associated action comprises calling the callback function.

10. The method of claim 1, wherein the log and trigger configuration comprises a message type, and wherein performing the associated action comprises sending a message of the message type to an application.

11. A telematics device for coupling to an asset communications bus of a vehicle, the telematics device comprising:
a controller;
a network interface coupled to the controller; and
a memory coupled to the controller and storing machine-executable programming instructions which, when executed by the controller, configure the telematics device to:
receive a log and trigger configuration; and
in response to determining that the log and trigger configuration contains a new log identifier, create a log configuration based on the log and trigger configuration;
in response to determining that the log and trigger configuration contains an existing log identifier, identify the log configuration associated with the existing log identifier;
create a trigger configuration including a trigger condition and an associated action;
associate the trigger configuration with the log configuration; and
in response to detecting the trigger condition, perform the associated action.

12. The telematics device of claim 11, wherein the machine-executable programming instructions further configure the telematics device to delete the trigger configuration in response to receiving a trigger removal request.

13. The telematics device of claim 11, the machine-executable programming instructions which configure the telematics device to create the log configuration comprise machine-executable programming instructions which configure the telematics device to store the log configuration in a database.

14. The telematics device of claim 11, the machine-executable programming instructions which configure the telematics device to create the log configuration comprise machine-executable programming instructions which configure the telematics device to create an AVL tree node in an AVL tree for storing the log configuration.

15. The telematics device of claim 14, wherein the machine-executable programming instructions which configure the telematics device to associate the trigger configuration with the log configuration comprise machine-executable programming instructions which configure the telematics device to add the trigger configuration to a list connected to the AVL tree node.

16. The telematics device of claim 14, wherein the log and trigger configuration includes a data trigger type, and the AVL tree is selected from a plurality of AVL trees based on the data trigger type.

17. The telematics device of claim 11, wherein the machine-executable programming instructions which configure the telematics device to detect the trigger condition comprise machine-executable programming instructions which configure the telematics device to capture asset data from the vehicle via the asset communications bus and evaluate the trigger condition for the asset data.

18. The telematics device of claim 11, wherein the machine-executable programming instructions which configure the telematics device to detect the trigger condition comprise machine-executable programming instructions which configure the telematics device to evaluate the trigger condition for debug data generated by the telematics device.

19. The telematics device of claim 11, wherein the log and trigger configuration comprises a callback function, and wherein the machine-executable programming instructions which configure the telematics device to perform the associated action comprise machine-executable programming instructions which configure the telematics device to call the callback function.

20. The telematics device of claim 11, wherein the log and trigger configuration comprises a message type, and wherein the machine-executable programming instructions which configure the telematics device to perform the associated action comprise machine-executable programming instructions which configure the telematics device to send a message of the message type to an application.

* * * * *